United States Patent
Jin et al.

(10) Patent No.: US 11,096,097 B2
(45) Date of Patent: Aug. 17, 2021

(54) COMMUNICATION METHOD AND COMMUNICATIONS DEVICE

(71) Applicant: HUAWEI TECHNOLOGIES CO., LTD., Guangdong (CN)

(72) Inventors: Yinghao Jin, Shanghai (CN); Feng Han, Shanghai (CN); Wei Tan, Shanghai (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 34 days.

(21) Appl. No.: 16/592,598

(22) Filed: Oct. 3, 2019

(65) Prior Publication Data

US 2020/0037214 A1 Jan. 30, 2020

Related U.S. Application Data

(63) Continuation of application No. PCT/CN2018/081537, filed on Apr. 2, 2018.

(30) Foreign Application Priority Data

Apr. 4, 2017 (CN) .......................... 201710215622.X

(51) Int. Cl.
*H04W 4/00* (2018.01)
*H04W 36/00* (2009.01)
(Continued)

(52) U.S. Cl.
CPC ... *H04W 36/0077* (2013.01); *H04W 28/0268* (2013.01); *H04W 36/0058* (2018.08);
(Continued)

(58) Field of Classification Search
None
See application file for complete search history.

(56) References Cited

U.S. PATENT DOCUMENTS

2016/0353465 A1* 12/2016 Vrzic ................ H04W 28/0247
2017/0079059 A1   3/2017 Li et al.
(Continued)

FOREIGN PATENT DOCUMENTS

CN   105813195 A   7/2016
CN   106060900 A   10/2016
(Continued)

OTHER PUBLICATIONS

Huawei, HiSilicon,"Slice Availability and Discovery in RAN",3GPP TSG-RAN WG2 Meeting #96 R2-167586,Reno, Nevada, USA, Nov. 14-18, 2016,total 3 pages.

*Primary Examiner* — Elisabeth Benoit Magloire
(74) *Attorney, Agent, or Firm* — Womble Bond Dickinson (US) LLP

(57) ABSTRACT

A communication method is provided. The method includes: receiving, by a first base station, a first request sent by a terminal, where the first request is used to request an RRC connection from the first base station; sending, by the first base station, a handover request to a second base station when the first base station does not support a network slice to which the terminal belongs, where the second base station supports the network slice to which the terminal belongs; and receiving, by the first base station, a handover request response from the second base station, and sending a first request response to the terminal, where the first request response includes configuration information of the second base station.

15 Claims, 12 Drawing Sheets

(51) Int. Cl.
*H04W 76/11* (2018.01)
*H04W 76/27* (2018.01)
*H04W 28/02* (2009.01)
*H04W 48/00* (2009.01)

(52) U.S. Cl.
CPC ..... *H04W 36/00835* (2018.08); *H04W 48/17* (2013.01); *H04W 76/11* (2018.02); *H04W 76/27* (2018.02)

(56) References Cited

U.S. PATENT DOCUMENTS

| | | | |
|---|---|---|---|
| 2017/0086118 A1* | 3/2017 | Vrzic | H04W 36/26 |
| 2018/0124660 A1* | 5/2018 | Zhang | H04W 84/02 |
| 2019/0021043 A1* | 1/2019 | Youn | H04W 36/0055 |
| 2019/0021047 A1 | 1/2019 | Zong | |
| 2019/0174368 A1* | 6/2019 | Decarreau | H04W 76/12 |
| 2020/0275356 A1* | 8/2020 | Forsman | H04L 41/0803 |
| 2020/0305054 A1* | 9/2020 | Zee | H04W 76/11 |

FOREIGN PATENT DOCUMENTS

| | | |
|---|---|---|
| CN | 106375987 A | 2/2017 |
| CN | 106572517 A | 4/2017 |
| WO | 2016192639 A1 | 12/2016 |
| WO | 2017023196 A1 | 2/2017 |
| WO | 2017034352 A1 | 3/2017 |

\* cited by examiner

COMMUNICATION METHOD AND COMMUNICATIONS DEVICE

CROSS-REFERENCE TO RELATED APPLICATIONS

This application is a continuation of International Application No. PCT/CN2018/081537, filed on Apr. 2, 2018, which claims priority to Chinese Patent Application No. 201710215622.X, filed on Apr. 4, 2017. The disclosures of the aforementioned applications are hereby incorporated by reference in their entireties.

TECHNICAL FIELD

The present disclosure relates to the field of wireless communications, and in particular, to a communication method and a communications device.

BACKGROUND

With rapid development of wireless communications technologies, a 5th generation (5G) wireless communications technology is already a hotspot currently in the industry. 5G is to support diverse application requirements, including supporting higher-rate experience, a higher-bandwidth access capability, lower-latency and high-reliability information exchange, and access, management, and the like of a larger-scale and low-costs machine type communication device. In addition, 5G is to support various vertical industry application scenarios oriented for internet of vehicles, emergency communication, and industrial Internet. Faced with these performance requirements and application scenarios of 5G, a 5G network needs to be closer to a specific requirement of a user, and a customization capability of 5G needs to be further improved.

In view of this, an important concept of a network slice is introduced into 5G. A network slice is a combination of a plurality of network functions (NFs) and corresponding resources for implementing a communication service, including a core network (CN) part, an radio access network (RAN) part, and/or a terminal part. The 5G network includes various network slices satisfying different connection capabilities, a network slice is a logical network meeting a communication service requirement of a type or a use case, and different network slices provide differentiated services for different users and services. One RAN can support a plurality of network slices. For example, one RAN can support a plurality of vertical industry applications. Similarly, one terminal can also support a plurality of network slices, to be specific, can support service operation of a plurality of network slices. Network functions constituting the network slice are divided into a public network function and a private network function. The public network function is a network function shared by a plurality of network slices. The private network function is a network function specially used by each network slice. In an actual network, there may be a plurality of public network functions, where one public network function may be shared by a plurality of network slices, another public network function may be shared by another plurality of network slices, and different network slices may share different public network functions.

When a terminal in inactive mode moves to a cell, the cell needs to be capable of supporting a network slice to which the terminal belongs before continuing to provide a service for the terminal. However, when the cell to which the cell moves does not support the network slice to which the terminal belongs, there is a risk of denying access. Therefore, a mechanism that can reduce an access failure risk needs to be urgently designed.

SUMMARY

Embodiments of the present disclosure provide a communication method, to reduce a risk of a connection failure of an inactive terminal in a moving state.

According to an aspect, an embodiment of the present disclosure provides a communication method, including:

receiving, by a first base station, a first request sent by a terminal, where the first request is used to request a radio resource control (RRC) connection from the first base station;

sending, by the first base station, a handover request to a second base station when the first base station does not support a network slice to which the terminal belongs, where the second base station supports the network slice to which the terminal belongs; and receiving, by the first base station, a handover request response from the second base station, and sending a first request response to the terminal, where the first request response includes configuration information of the second base station.

When an inactive terminal is in a process of moving, if a first base station to which the terminal moves does not support a network slice to which the terminal belongs, the first base station can perform cell redirection for the terminal, and the terminal is redirected to a base station that supports the network slice to which the terminal belongs, thereby avoiding a risk of a connection failure.

In one embodiment, the first request includes a cell list that the terminal is allowed to access, and the sending, by the first base station, a handover request to a second base station includes: selecting the second base station based on the cell list, and sending the handover request to the selected second base station. In this way, the terminal can add, to the first request, the cell list that the terminal is allowed to access, thereby improving subsequent access efficiency.

In one embodiment, the first request further includes at least one of the following messages:

network slice indication information, used to notify the first base station of information about the network slice to which the terminal belongs; and cause information, used to notify the first base station of an objective of sending the first request.

In this way, when sending the first request, the terminal can report the network slice indication information, the cause information, and the like of the terminal to the first base station, to help the first base station make a decision.

In another embodiment, after the receiving, by a first base station, a first request sent by a terminal, the method further includes:

sending, by the first base station, a second request to a third base station, where the third base station is a base station on which the terminal previously camps, the second request is used to request context information of the terminal on the third base station, and the context information is configuration information when the terminal camps on the third base station; and receiving, by the first base station, the context information of the third base station.

In this way, the first base station can obtain the context information from the base station on which the terminal previously camps, to facilitate decision making.

In one embodiment, the context information includes at least one of the following messages:

flow context information, where the flow context information is information about a flow already allocated by the terminal, and includes at least one of flow ID information, flow priority information, QoS information, and network slice information corresponding to the flow;

bearer information, where the bearer information is information about a bearer already allocated by the terminal, and includes at least one of bearer ID information, QoS information, and network slice information corresponding to the bearer;

information about a mapping between the flow and the bearer; and at least one of single network slice selection assistance information (S-NSSAI), network slice selection assistance information (NSSAI), a network slice identifier (slice ID), and a temporary identifier (temp ID) of the terminal.

In another embodiment, the sending, by the first base station, a handover request to a second base station includes:

sending, by the first base station, a measurement request to the terminal, where the measurement request is used to obtain a cell list that the terminal is allowed to access;

receiving, by the first base station, a measurement report, and selecting, by the first base station, the second base station based on the measurement report; and sending, by the first base station, the handover request to the selected second base station.

According to another aspect, an embodiment of the present disclosure provides another communication method, including:

receiving, by a first base station, a first request sent by a terminal, where the first request is used to request a radio resource control (RRC) connection from the first base station;

sending, by the first base station, a path switch request to a common control plane network function (CCNF) when the first base station does not support a network slice to which the terminal belongs, to switch a path to the network slice to which the terminal belongs; and receiving, by the first base station, a path switch request response from the CCNF, and sending a first request response to the terminal, where the first request response includes configuration information of the CCNF.

When an inactive terminal is in a process of moving, if a first base station to which the terminal moves does not support a network slice to which the terminal belongs, the first base station can perform path redirection for the terminal, and the terminal is redirected to a base station that supports the network slice to which the terminal belongs, thereby avoiding a risk of a connection failure.

According to still another aspect, an embodiment of the present disclosure provides another communications method, including:

sending, by a terminal, a first request to a first base station, where the first request is used to request an RRC connection from the first base station; and receiving, by the terminal, a first request response from the first base station, where the first request response includes configuration information of a second base station, the second base station is a base station that supports a network slice to which the terminal belongs and that is determined by the first base station when the first base station does not support the network slice to which the terminal belongs, and handing over, by the terminal, to the second base station based on the first request response.

In one embodiment, the method further includes: receiving, by the terminal, a measurement request sent by the first base station, where the measurement request is used to obtain a cell list that the terminal is allowed to access.

According to still another aspect, an embodiment of the present disclosure provides a communications device, where the communications device has a function of implementing actual behavior of the first base station in the foregoing method. The function may be implemented by using hardware, or by executing corresponding software by using hardware. The hardware or the software includes one or more modules corresponding to the foregoing function.

In one embodiment, a structure of the base station includes a processor and a transmitter. The processor is configured to support the base station in performing the corresponding function in the foregoing method. The transceiver is configured to: support communication between the base station and a terminal, and send information or an instruction in the foregoing method to the terminal. The base station may further include a memory. The memory is configured to be coupled to the processor, and stores a program instruction and data that are suitable for the base station.

According to another aspect, an embodiment of the present disclosure provides a terminal. The terminal has a function of implementing behavior of the terminal in the foregoing method design. The function may be implemented by using hardware, or by executing corresponding software by using hardware. The hardware or the software includes one or more modules corresponding to the foregoing function. The module may be software and/or hardware.

In one embodiment, a structure of the terminal includes a transceiver and a processor, and the transceiver is configured to: support the terminal in receiving various instructions configured by the foregoing base station for the terminal, and send data or signaling generated corresponding to the instructions. The processor supports the terminal in performing the function of the terminal in the foregoing communication method. The terminal may further include a memory. The memory is configured to be coupled with the processor, and stores a program instruction and data that are suitable for the base station.

According to another aspect, a computer program product is provided. The computer program product includes computer program code. When the computer program code is run by a communications unit, a processing unit, a transceiver, or a processor of a communications device (for example, a network device or a network management device), the network device performs the method in the foregoing implementation.

According to another aspect, a computer-readable storage medium is provided. The computer-readable storage medium stores a program, and the program enables user equipment to perform the method in the foregoing implementation.

Compared with the prior art, in the solutions provided in the present disclosure, a redirection operation may be performed for the terminal when the terminal moves to the base station that does not support the network slice to which the terminal belongs, thereby avoiding a risk of a connection failure and improving communication efficiency.

These aspects and other aspects of the present disclosure are more concise and more comprehensive in descriptions of the following (a plurality of) embodiments.

DESCRIPTION OF DRAWINGS

The following briefly describes the accompanying drawings used for describing the embodiments of the present disclosure.

DESCRIPTION OF EMBODIMENTS

Figure 1:
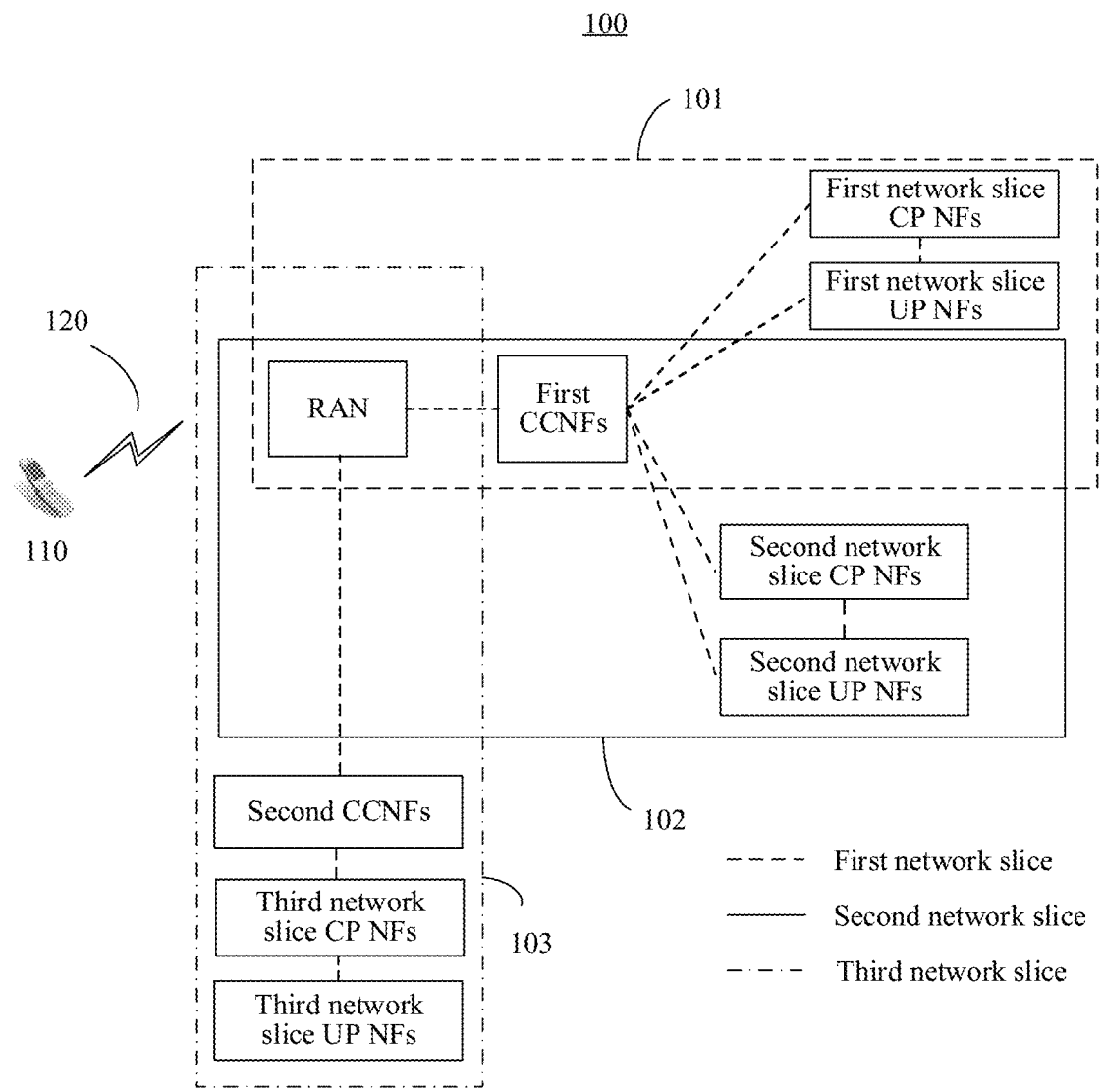
FIG. 1 is a schematic architectural diagram of a network slice according to an embodiment of the present disclosure.

The following describes the embodiments of the present disclosure with reference to the accompanying drawings in the embodiments of the present disclosure.

In the present disclosure, the word "example" is used to represent giving an example, an illustration, or a description. Any embodiment described as "example" in the present disclosure should not be explained as being more preferred or having more advantages than another embodiment. To enable any person skilled in the art to implement and use the present disclosure, the following description is provided. In the following description, details are listed for the purpose of explanation. It should be understood that a person of ordinary skill in the art can realize that the present disclosure can also be implemented when these specific details are not used. In other examples, commonly known structures and processes are not described in detail, to prevent unnecessary details from making descriptions of the present disclosure obscure. Therefore, the present disclosure is not intended to limit the shown embodiments, but is in accord with the broadest scope of the principles and features disclosed in the present disclosure.

In the specification, claims, and accompanying drawings of the present disclosure, the terms "first", "second", "third", "fourth", and so on (if existent) are intended to distinguish between similar objects but do not necessarily indicate a specific order or sequence. It should be understood that the data termed in such a way are interchangeable in proper circumstances so that the embodiments of the present disclosure described herein can be implemented in other orders than the order illustrated or described herein. Moreover, the terms "include", "contain" and any other variants mean to cover the non-exclusive inclusion, for example, a process, method, system, product, or device that includes a list of operations or units is not necessarily limited to those units, but may include other units not expressly listed or inherent to such a process, method, system, product, or device.

The terms "system" and "network" in this specification may be used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

Specific embodiments are used below to describe in detail the technical solutions of the present disclosure. The following several specific embodiments may be combined with each other, and a same or similar concept or process may not be described repeatedly in some embodiments.

It should be understood that, the embodiments of the present disclosure may be applied to various communications systems supporting a network slice architecture, for example: a global system for mobile communications (GSM), a code division multiple address (CDMA) system, a wideband code division multiple access (WCDMA) system, a general packet radio service (GPRS), a long term evolution (LTE) system, an advanced long term evolution (LTE-A) system, a universal mobile telecommunications system (UMTS), or a next-generation communications system, such as a new radio (NR) system or evolved LTE (eLTE).

FIG. 1 shows a communications system 100 provided in an embodiment of the present disclosure. A terminal 110 communicates with a network device through a radio link 120. The network device includes a RAN device and a CN device. The RAN device may be an access point (AP) in a WLAN, a base transceiver station (BTS) in a GSM or CDMA, or may be a NodeB (NB) in WCDMA, or be may an evolved NodeB (eNB or eNodeB) in LTE, or a relay node or an access point, or a vehicle-mounted device, a wearable device and a network device in a future 5G network or a network device in a future evolved PLMN network, for example, may be a 5G base station (for example, Next-Generation Node B (gNB) or Next-Generation Radio (NR)), a transmission and reception point (TRP), a centralized unit (CU), or a distributed unit (DU). The CN device may be a mobility management entity (MME) in LTE, or a gateway, or may be a control plane (CP) network function (NF) and a user plane (UP) network function in a 5G network, for example, a common control plane network function (Common CP NF; CCNF). The CCNF may include but is not limited to at least one of an access and mobility management function (AMF), a session management network function (Session Management NF; SMF), and the like. A RAN supports a plurality of network slices in a CN, for example, a first network slice 101, a second network slice 102, and a third network slice 103. On a CP plane of the CN, the plurality of network slices have both common CP NFs and respective dedicated CP NFs. On a UP plane of the CN, each network slice has dedicated UP NFs. For example, the first network slice and the second network slice in FIG. 1 have both common first CCNFs and respective dedicated CP NFs and UP NFs, and the third network slice also has common second CCNFs and dedicated CP NFs and UP NFs of the third network slice. It should be understood that, the second CCNFs own by the third network slice may be common CP NFs shared by the third network slice and a network slice other than the first network slice and the second network slice. For example, there is a first AMF of a network slice corresponding to the first CCNFs in the CCNFs, and the first AMF is used to manage access and mobility of the first network slice and the second network slice. There is a second AMF of a network slice corresponding to the second CCNFs in the CCNFs, and the second AMF is used to manage access and mobility of the third network slice.

The network slice further has the following features. 1. On a core network (CN) side, different network slices may have a shared CCNF. 2. On a CN side, different network slices may have a particular control plane function and data plane function, and the particular control plane function and data plane function of the network slice is referred to as a network slice instance. 3. On an access network (Radio Access Network, RAN) side, one RAN device may support a same network slice or different network slices. For example, there are two cases for supporting different network slices. In one case, all network slices share a network a resource, and support different slices through radio resource management (RRM). In the other case, network slices are isolated on resources. 4. From a perspective of a user side, one user may access a plurality of network slices but usually access one CCNF. In other words, the user may access a plurality of NSIs but access one CCNF. An NSI on which the user is to establish a session is determined by the CCNF. Because there are a plurality of CCNFs on the CN side, in some cases, the RAN device selects a CCNF for the user based on network slice selection assistance information (NSSAI). If the selected CCNF is inappropriate, the CCNF performs redirection for the user.

In addition, in this embodiment of the present disclosure, the network device provides a service for a cell, and the terminal communicates with the network device by using a transmission resource (for example, a frequency domain resource, or a spectrum resource) used by the cell. The cell may be a cell corresponding to the network device (for example, a base station). The cell may belong to a macro base station, a hyper cell, or a base station corresponding to a small cell. The small cell herein may include a metropolitan cell (Metro cell), a micro cell, a pico cell a femto cell, or the like. These small cells have features of small coverage and low transmit power, and are applicable to providing a high-rate data transmission service.

Due to differences in functions or policies of different vendors or operators, different RAN devices have different support capabilities for the network slice, and network slices supported within coverage of the different RAN devices are different. For one case, refer to FIG. 2a. Within coverage of a RAN #A, an NS 1, an NS 3, and an NS 4 are supported. Within coverage of a RAN #B, an NS 1, an NS 2, and an NS 3 are supported. Within coverage of a RAN #C, an NS 2, an NS 3, and an NS 4 are supported. Coverage of different base stations is basically orthogonal, and a relatively small quantity of parts intersect, and this usually exists in a scenario of multi-cell intra-frequency deployment. For another case, refer to FIG. 2b. Within coverage of a RAN #A, an NS 1, an NS 3, and an NS 4 are supported within coverage of different base stations, and an NS 2 is supported within coverage of a RAN #B. Coverage of different base stations overlaps, and a relatively large quantity of parts intersect, and this usually exists in a scenario of cell inter-frequency deployment.

The terminal 110 may also be referred to as a user, user equipment (UE), an access terminal, a subscriber unit, a subscriber station, a mobile station, a mobile console, a remote station, a remote terminal, a mobile device, a user terminal, a terminal, a wireless communications device, a user agent, or a user apparatus. The terminal may be a station (ST) in a wireless local area network (WLAN), may be a cellular phone, a cordless phone, a session initiation protocol (SIP) phone, a wireless local loop (WLL) station, a personal digital assistant (PDA) device, a handheld device that has a wireless communication function, a relay device, a computing device, another processing device connected to a wireless modem, a vehicle-mounted device, a wearable device, a terminal in a next-generation communications system, for example, a fifth-generation communication (5G) network, a terminal in a future evolved public land mobile network (PLMN) network, or the like.

By way of example and not limitation, in this embodiment of the present disclosure, the terminal may alternatively be a wearable device. The wearable device may also be referred to as a wearable intelligent device, and is a general term of wearable devices, such as glasses, gloves, watches, clothes, and shoes, that are developed by applying wearable technologies to intelligent designs of daily wear. The wearable device is a portable device that can be directly worn on a body or integrated into clothes or an accessory of a user. The wearable device is not merely a hardware device, but is used to implement a powerful function through software support, data interaction, and cloud interaction. Generalized wearable intelligent devices include full-featured and large-sized devices that can implement complete or partial functions without depending on smartphones, such as smartwatches or smart glasses, and devices that focus on only one type of application and need to work with other devices such as smartphones, such as various smart bands or smart jewelries for vital sign monitoring.

Figure 3:
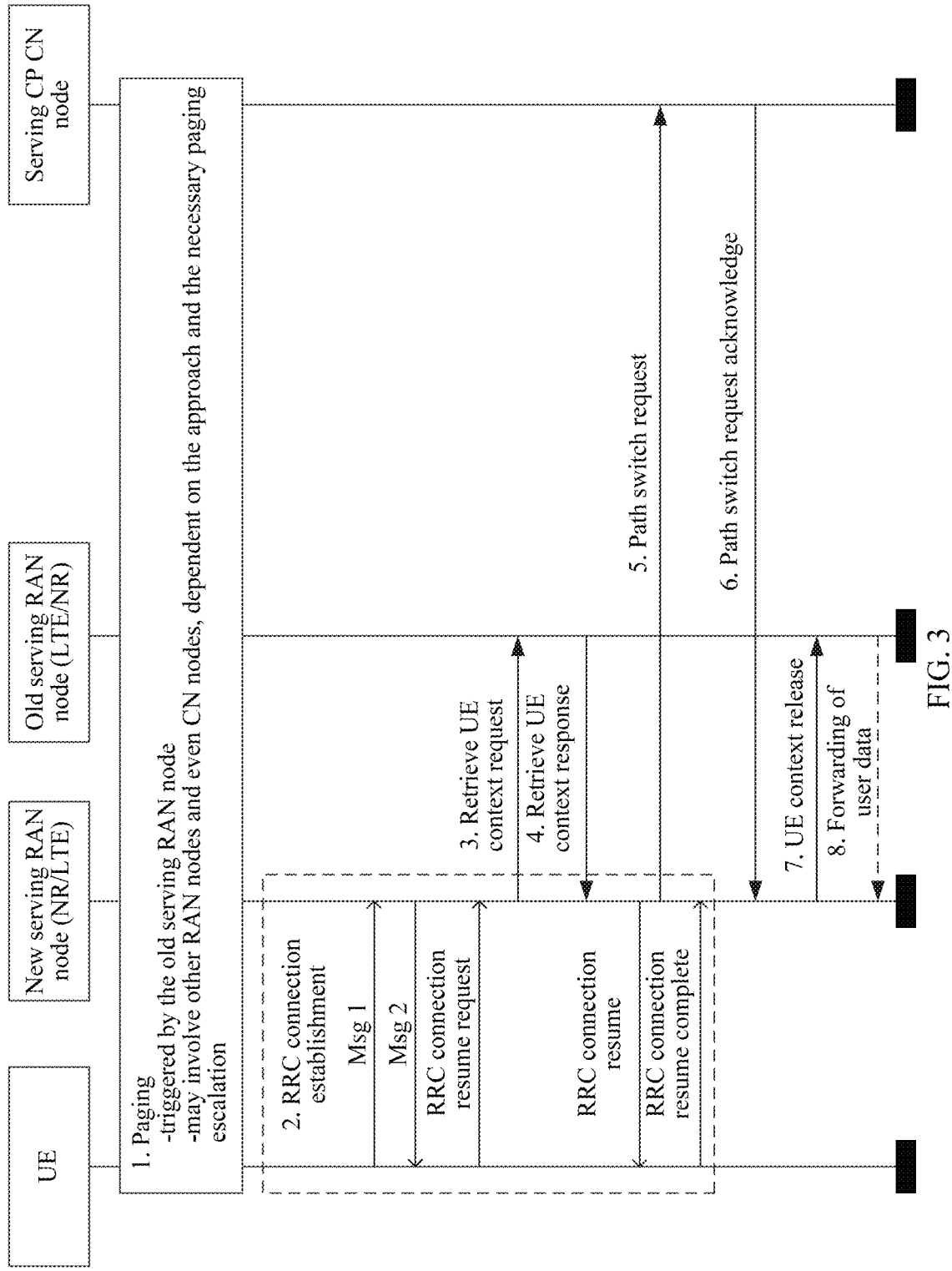
FIG. 3 is a signaling interaction diagram of a terminal movement method according to an embodiment of the present disclosure.

When the terminal moves to a target base station, and needs to exchange signaling with the target base station, for example, needs to send uplink data, or the target base station and a cell on which the terminal previously camps are located in different RAN notification areas, location update (for example, RAN notification area update) needs to be performed. If the target base station does not support a network slice to which the terminal currently belongs, RRC may fail, and consequently, uplink data cannot be sent, or location update cannot be performed for a RAN notification area. The RAN notification area (RNA) includes one or more cells. If the RAN notification area includes a plurality of cells, the plurality of cells may belong to one gNB, or may belong to a plurality of gNBs. When an inactive terminal moves within the RNA, the network may not be notified. However, when the terminal moves out of the RNA, the network needs to be notified. As shown in FIG. 3, after an inactive-mode or idle-mode terminal moves from a previously camped-on cell (for a user of the inactive terminal, camping on a cell means that the terminal changes from an RRC connection state to an inactive state in the camped-on cell) to a new serving cell (also referred to as a "target base station" below), an access network paging area update (RAN paging area update) process is triggered, so that an interface connection (for example, an NG2 interface) of the terminal and context information of the terminal are updated to the new serving cell. If the target base station supports a user network slice to which a user currently belongs, the user subsequently may access a target cell, and continues to be served by the target base station. If the target base station does not support a user network slice to which a user currently belongs, there is a risk for the user to access the target base station.

Figure 2A:
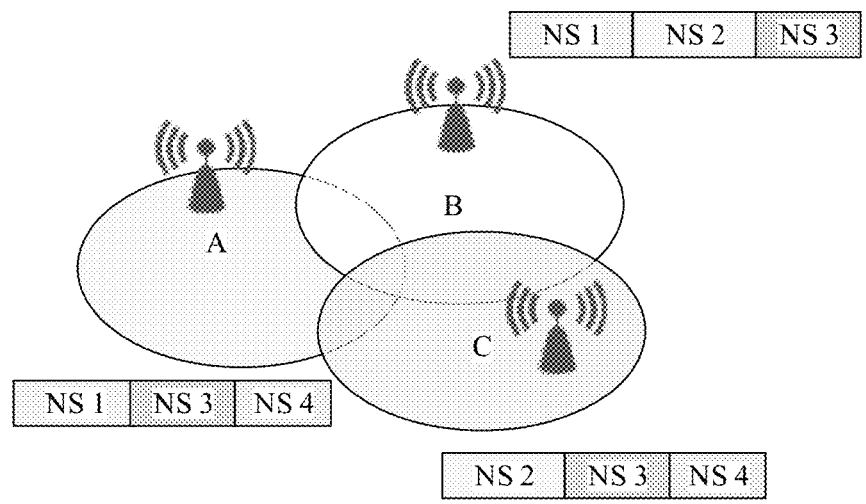
FIG. 2a and FIG. 2b are each a simplified schematic diagram of an application scenario according to an embodiment of the present disclosure.
Figure 2B:
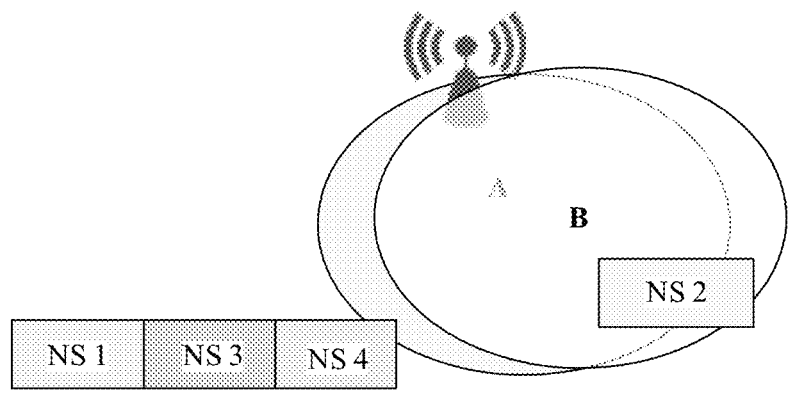

The following describes, by using examples, the case in which the target base station does not support a user network slice to which a user currently belongs. In a first example, the target base station does not support a CCNF of the network slice to which the user belongs. In a second example, the target base station supports a CCNF of the network slice to which the user belongs, but does not support a dedicated network function (collectively referred to as an NSI below) of the network slice. Application scenarios shown in FIG. 2a and FIG. 2b are used as an example. A network slice corresponding to the NS 1 is a CCNF 1+an NSI 1, a network slice corresponding to the NS 2 is a CCNF 1+an NSI 2, a network slice corresponding to an NS 3 is a CCNF 1+an NSI 3, and a network slice corresponding to the NS 4 is a CCNF 2+an NSI 4. That the network slice to which the user currently belongs is the NS 1 is used as an example. It is assumed that a network slice supported by a target base station A is the NS 4, and the target base station A does not support the CCNF 1 in the network slice NS 1 to which the user currently belongs. In this case, the target base station A belongs to the foregoing first example. It is assumed that a network slice supported by the target base station A is the NS 2, and the target base station A supports the CCNF 1 in the network slice NS 1 to which the user currently belongs, but does not support the NSI 2. In this case, the target base station A belongs to the foregoing second example.

The following describes in detail method embodiments of the present disclosure with reference to FIG. 4 to FIG. 13. Specific embodiments are used below to describe in detail the technical solutions of the present disclosure. The following several specific embodiments may be combined with each other, and a same or similar concept or process may not be described repeatedly in some embodiments. It should be understood that, FIG. 4 to FIG. 13 are each a schematic flowchart of a communication method according to an embodiment of the present disclosure, and show detailed communication operations or operations of the method. However, these operations or operations are merely examples. Other operations or variants of various operations in FIG. 4 to FIG. 13 may be further performed in the embodiments of the present disclosure. In addition, operations in FIG. 4 to FIG. 13 may be separately performed in orders different from those presented in FIG. 4 to FIG. 13, and operations in FIG. 4 to FIG. 13 may not all be performed.

The communication method disclosed in each embodiment of the present disclosure may be applied to different application scenarios. In this way, when an inactive-mode or idle-mode terminal moves from a third base station to a target base station, even if the target base station does not support a network slice to which a user currently belongs, the target base station can still perform redirection, thereby avoiding a risk that the terminal cannot access a network.

The following first defines some parameters to be used in the embodiments of the present disclosure. It should be noted that, in different embodiments, specific types of messages included in the following parameters may be different. In a same embodiment, message content transferred in different operations performed in the methods may be different. It should be noted that, when different embodiments are described, specific parameters included in context information may be directly used for description.

Network slice indication information is used to notify a RAN device (for example, a first base station) of a network slice to which a terminal currently belongs. The network slice indication information may be at least one of the following information: network slice selection assistance information (NSSAI) allocated by a communications system to the terminal, single network slice selection assistance information (S-NSSAI), a network slice identifier (Slice ID), and a temporary identifier (Temporary ID). The S-NSSAI may be either of a slice/servie type (SST) or a slice differentiator (SD). Information about the temporary identifier is allocated by an AMF to a terminal that has registered on a CN side. The temporary identifier may uniquely point to a particular AMF.

The context information is used to convey configuration information of a session, a flow, or a bearer between different network elements. In different procedures, types of messages included in the context information may be different. Specifically, the context information may include one or more of the following messages:

1. flow context information, which may include at least one of a flow ID (or referred to as flow ID information), a flow priority, QoS (Quality of Service) information, and network slice information corresponding to the flow;

2. data radio bearer (DRB) information, which may include at least one of a bearer ID (or referred to as bearer ID information), QoS information, and network slice information corresponding to the bearer;

3. information about a mapping between a bearer and a flow, where this is because for a session, a core network uses a form of a flow, but a RAN uses a form of a data radio bearer, and the RAN needs to match the data radio bearer with the flow of the core network;

4. network slice indication information corresponding to a current session of the terminal, where the network slice indication information includes at least one of NSSAI, a slice ID, a temp ID, and S-NSSAI; and 5. a mapping policy message, used to indicate a network slice to which the network slice to which the terminal currently belongs may be further remapped. For example, the terminal currently performs communication in a network slice 1 and a network slice 2, and the mapping policy message may include information about a network slice 3 and a network slice 4. This indicates that the network slice 1 may be further remapped to the network slice 3 or the network slice 4. In this case, when the first base station does not support the network slice 1, the first base station may further map the network slice 1 to the network slice 3 or the network slice 4 that is supported by the first base station for service. The mapping policy information provides a network slice to which the first base station may be remapped when the first base station does not support the network slice to which the terminal belongs.

Figure 4:
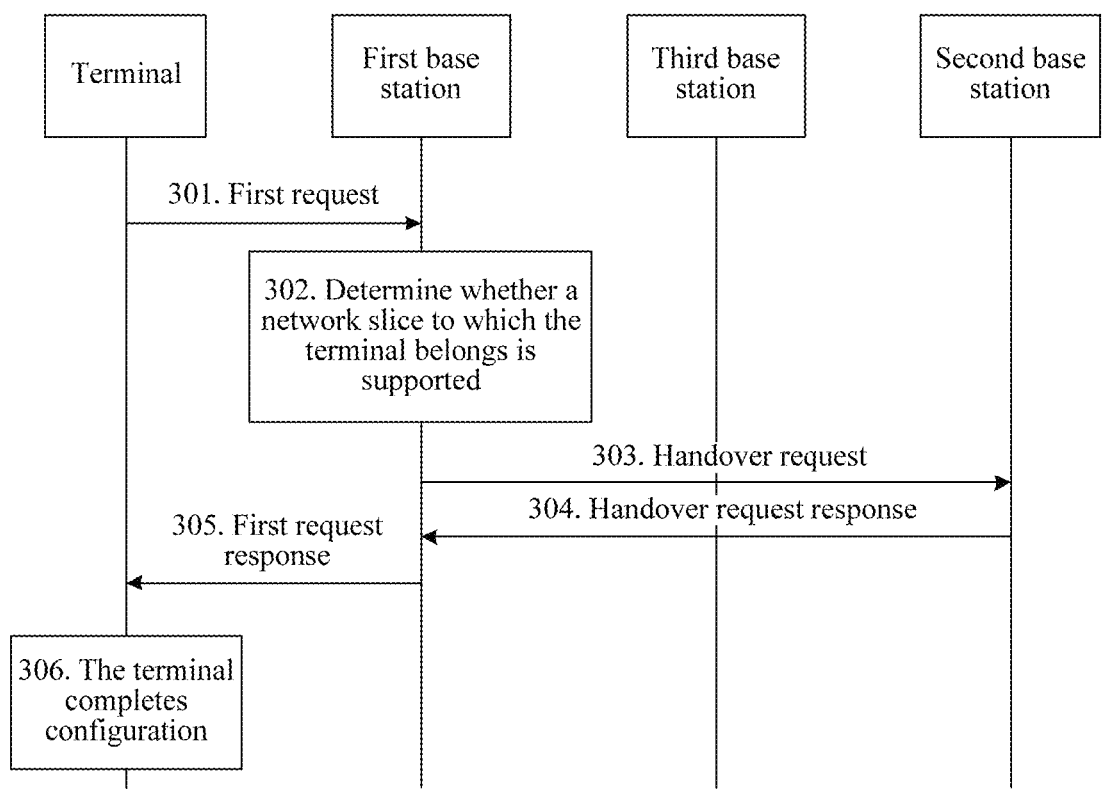
FIG. 4 is a signaling interaction diagram of a communication method according to an embodiment of the present disclosure.

FIG. 4 is a schematic flowchart of a communication method according to an embodiment of the present disclosure. The communication method may be applied to the communications system 100 shown in FIG. 1. An application scenario of the communication method shown in FIG. 4 may be as follows: When a terminal moves to a cell that does not support a network slice to which the terminal belongs, an RRC connection is established in a cell redirection manner. In this embodiment, a first base station is a target base station to which the terminal moves, a second base station is a camped base station on which the terminal previously camps, and a third base station is a redirected base station when the first base station does not support the network slice to which the terminal belongs. The communication method includes the following operations.

Operation 301. The terminal sends a first request to the first base station, where the first request is used to request an RRC connection from the first base station.

Operation 302. The first base station receives the first request, and determines whether the network slice to which the terminal belongs is supported.

Specifically, the first base station obtains information about the network slice to which the terminal belongs. For example, the information about the network slice to which the terminal belongs may be obtained based on a parameter carried in the first request, or obtained in another manner. This is to be described in more details below. When the first base station supports the network slice to which the terminal belongs, the first base station establishes the RRC connection to the terminal. When the first base station does not support the network slice to which the terminal belongs, operation 303 is performed.

Operation 303. The first base station sends a handover (HO) request to a second base station when the first base station does not support the network slice to which the terminal belongs, where the second base station supports the network slice to which the terminal belongs.

Specifically, the first base station may obtain a cell list that the terminal is allowed to access, to select the second base station that supports the network slice to which the terminal belongs. That the first base station obtains, based on the first request or in another manner, the cell list that the terminal is allowed to access is to be described in more detail below.

The handover request includes context information of the terminal. The context information is configuration information when the terminal camps on the third base station. For a type of a message included in the context information, refer to the foregoing descriptions.

Operation 304. The second base station receives the handover request, and sends a handover request response to the first base station. For example, the handover request response may include context information of the second base station, and includes but is not limited to at least one of a data radio bearer configuration of the second base station, and a mapping relationship (Flow mapping) between a DRB configuration and a flow.

Operation 305. The first base station receives the handover request response, and sends a first request response to the terminal, where the first request response includes configuration information of the second base station. The first request response may be referred to as an RRC reconfiguration request (RRC Connection Reconfig), and includes but is not limited to the context information of the second base station.

Operation 306. The terminal receives the first request response, and performs corresponding session configuration based on the configuration information of the second base station that is included in the first request response, to establish at least one default session on one network slice.

In one case, the terminal may store the received configuration information, then continue to be in an inactive state, and need to establish at least one default session on at least one network slice, so that the terminal can perform rapid access when subsequently entering an active mode. Alternatively, the second base station may complete a synchronization process, and the terminal sends an RRC configuration complete message to the second base station, and after an RRC configuration is completed, the terminal enters an RRC connection state. When appropriate, the terminal may perform data transmission based on configured RRC.

If the terminal initiates an access request to the target base station, but the target base station does not support the network slice to which the terminal currently belongs, the terminal is redirected to another cell that can support the network slice to which the terminal belongs for access, thereby avoiding a risk of an RRC connection failure.

The following describes the first request in more detail. In operation 301, the first base station is a cell (corresponding to the foregoing "target base station") to which the terminal moves. The first request may be referred to as an RRC connection resume request message, and is used to request to establish an RRC connection to the first base station. In one embodiment, the first request may include one or more of the following messages:

1. cell list information includes a set of cells that the terminal can currently access;
2. network slice indication information, for which, refer to the foregoing descriptions;
3. cause information, used to notify a RAN device of an objective of sending the first request; and In this implementation, the objective of sending the first request is for data transmission. Carrying a cause message can enable the RAN device to perform congestion control, for example, enable the RAN device to set an access priority of data transmission to be higher than a priority of signaling transmission. In other words, when a network is congested, the RAN device preferentially allows a terminal that transmits data to access the network.

In one embodiment, the cause information may be alternatively used to indicate a data type, so that congestion can be more accurately controlled, thereby improving network performance. The data type may include but is not limited to ultra-reliable low latency communications (URLLC) service data, enhanced mobile broadband (eMBB) communication service data, and massive machine type communication (mMTC) service data.

4. a resume identifier (Resume ID), used to identify the terminal, and enable the first base station to find the third base station.

The following describes in more detail a manner in which the first base station obtains the network slice to which the terminal belongs.

In one embodiment, in operation 302, when the first request includes the network slice indication information, the first base station may obtain, based on the configured network slice indication information, the network slice to which the terminal currently belongs.

Figure 5:
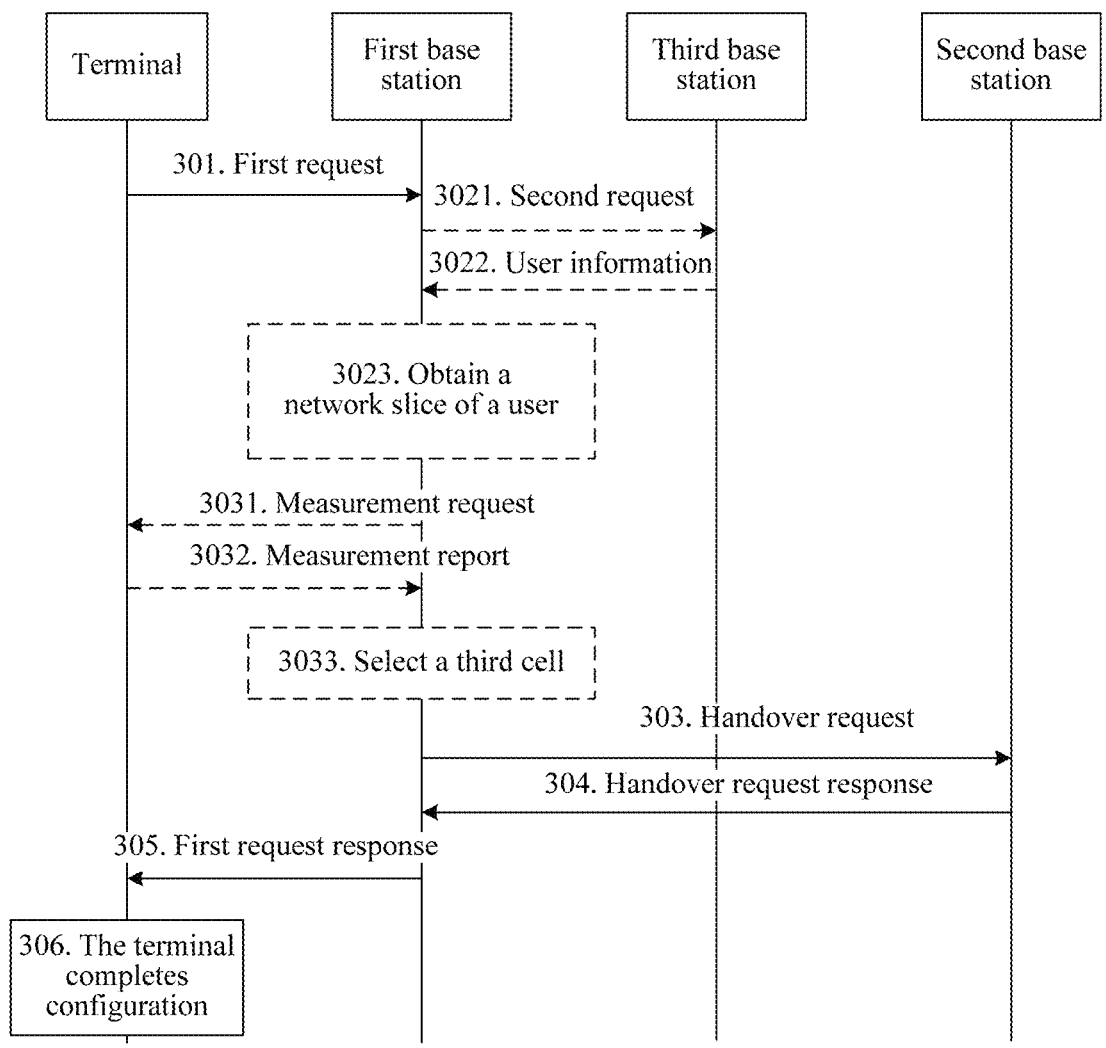
FIG. 5 is a signaling interaction diagram of another communication method according to an embodiment of the present disclosure.

In one embodiment, when the first request does not include the network slice indication information or the network slice to which the terminal belongs cannot be determined based on the network slice indication information carried in the first request, the first base station may further obtain, by using the following method, the network slice to which the terminal currently belongs. Referring to FIG. 5, operation 302 includes the following operations.

Operation 3021. The first base station sends a second request to the third base station (equivalent to the base station on which the terminal previously camps), to request terminal context information of the terminal in the third base station. The second request may be referred to as a retrieval context request.

In one embodiment, when the first request carries a resume ID, the first base station may obtain the third base station based on the resume ID.

Operation 3022. The third base station receives the second request, and sends the context information to the first base station. The context information may also be referred to as a retrieval context response. For the context information, refer to the foregoing definition. It should be noted that, although the NSSAI, the slice ID, the temp ID, and the S-NSSAI are optional items, if the first request does not carry any one of the NSSAI, the slice ID, the temp ID, and the S-NSSAI, the context information sent by the third base station to the first base station needs to include at least one of the NSSAI, the slice ID, the temp ID, and the S-NSSAI.

Operation 3023. The first base station receives the context information, to obtain a network slice to which a user currently belongs and related configuration information, to determine whether the first base station can support the network slice to which the user currently belongs.

The following describes in more detail a manner in which the first base station obtains the cell list that the terminal is allowed to access.

In operation 303, in one embodiment, when the first request of the terminal carries the cell list, the first base station may select, based on the cell list, the second base station that can support the network slice to which the user belongs.

In one embodiment, when the first request of the terminal does not carry the cell list, the first base station may obtain the cell list in the following manner. Still referring to FIG. 5, operation 303 includes the following operations.

Operation 3031. The first base station sends a measurement request to the terminal, where the measurement request is used to obtain the cell list that the terminal is allowed to access.

For example, the measurement request includes a measurement configuration and a list of cells that need to be measured. For example, the measurement configuration includes a trigger event, and the like. The list of cells that need to be measured may be a set of cells supporting the network slice to which the terminal currently belongs. In one embodiment, the measurement request may further include a form indication of a measurement report. The form indication is used to indicate a form of a measurement report of the terminal. For example, the measurement report includes a list of all cells that the terminal currently can access, or the measurement report includes signal quality of all cells in the list of cells that need to be measured. The foregoing two examples of the form of the measurement report may exist alone, or may both exist.

Operation 3032. The terminal receives the measurement request, and generates a measurement report in response to the measurement request, and sends the measurement report. In response to the form indication included in the measurement request, the measurement report generated by the terminal includes at least one of the list of all cells that the terminal currently can access, and the signal quality of all cells in the list of cells that need to be measured.

Operation 3033. The first base station receives the measurement report, and selects, based on the measurement report, the second base station that supports a network slice of a user.

Figure 6:
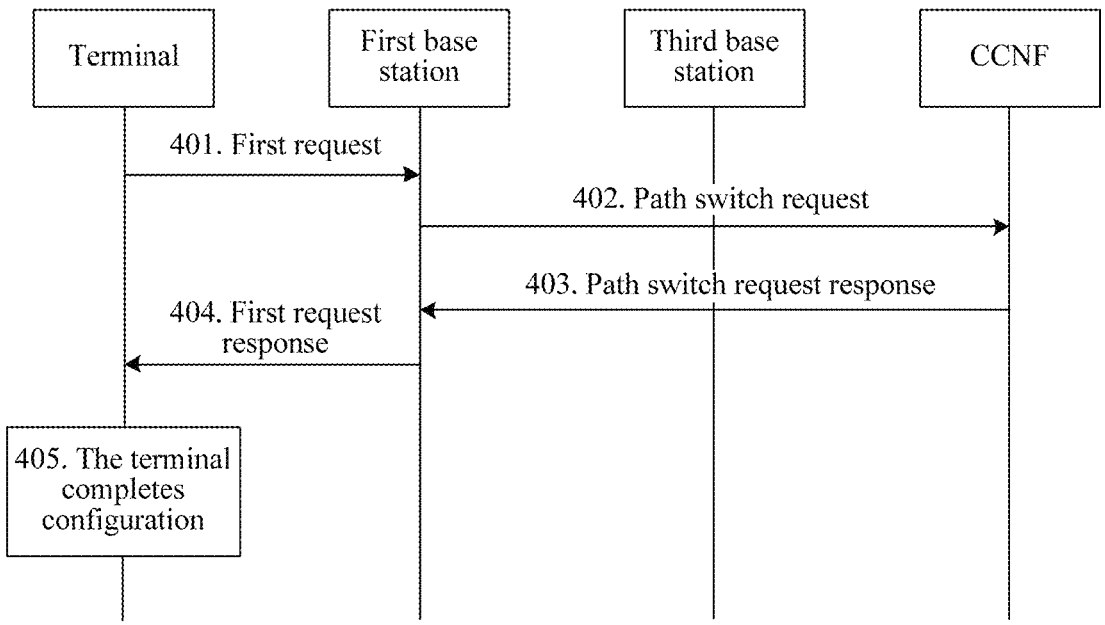
FIG. 6 is a signaling interaction diagram of another communication method according to an embodiment of the present disclosure.

FIG. 6 is a schematic flowchart of another communication method according to an embodiment of the present disclosure. The communication method 400 is applied to the communications system 100 shown in FIG. 1, and in the following, a first base station corresponds to a cell to which a terminal moves, a second base station corresponds to a cell to which the terminal needs to hand over, and a third base station corresponds to a cell on which the terminal previously camps. The communication method includes the following operations.

Operation 401. The terminal sends a first request to the first base station, where the first request is used to request an RRC connection from the first base station. It should be noted that, due to different application scenarios, details of descriptions of the first request and the first request in operation 301 in the embodiment shown in FIG. 4 are not described herein again.

Operation 402. The first base station receives the first request, and when the first base station does not support a network slice to which the terminal belongs, the first base station sends a path switch request to a CCNF. Path switch refers to transfer of a session from a port in a base station on which the terminal originally camps to a port in a base station to which the terminal moves.

In one embodiment, in operation 402, when the first request includes configured network slice indication information, the first base station may obtain, based on the configured network slice indication information, a network slice to which the terminal currently belongs, to determine whether the first base station supports the network slice to which the terminal belongs.

In one embodiment, when the first request does not include configured network slice indication information, the first base station may alternatively obtain, with reference to the manner of operations 3021 to 3023 shown in FIG. 5, a network slice to which the terminal currently belongs. In one embodiment, compared with the context information described in operation 3022, it should be specially noted that, context information in this embodiment may further include:

at least one of a flow indication that can be accepted by the first base station and a semi-accepted flow indication that are included in the path switch request. The semi-accepted flow indication indicates that the first base station can meet a QoS requirement of the flow, but network slice remapping needs to be performed. In one embodiment, the path switch request may further include at least one type of network slice indication information corresponding to the semi-accepted flow indication, to be specific, network slice indication information obtained after the first base station performs remapping based on mapping policy information. For example, different NSIs represent different tenants. For example, an NSI 1 is a BMW tenant, and an NSI 2 is a Benz tenant. Services provided for two tenants may be the same, to be specific, QoS is the same, but charges are different. For commercial reasons, the first base station supports the BMW tenant, namely, the NSI 1, but does not support the Mercedes-Benz tenant, namely, the NSI 2. In this case, when a terminal of the Mercedes-Benz tenant moves to the first base station, the target base station finds, based on the mapping policy information, that the terminal of the NSI 2 may be remapped to the NSI 1 to continue the service.

In one embodiment, before the first base station sends the path switch request to the CCNF, if the first base station determines, based on a first configuration message, that the first base station can satisfy QoS of at least one session of the terminal and can establish a bearer for the terminal, the first base station may establish a bearer for the terminal.

Operation 403. The CCNF receives the path switch request, and sends a path switch request ACK to the first base station. The path switch request response includes one or more of the following information:

1. network slice indication information, where the network slice indication information herein is network slice indication information that can be received, is NSSAI that is reconfigured by the CCNF based on the path switch request, and may also be referred to as accept NSSAI; for the network slice indication information, refer to the foregoing definition; and compared with the configured network slice indication information that is in one embodiment carried in the first request, some or all S-NSSAI in the accepted NSSAI changes, or SD information of some S-NSSAI in the accept NSSAI changes, and if the S-NSSAI includes only an SST but cannot specifically indicate a particular NSI, the SD information may further indicate the S-NSSAI, so that the S-NSSAI can indicate a specific NSI; and 2. context information, where the context information is flow context information reconfigured by the CCNF, and includes one or more of a flow priority, an aggregate maximum bit rate (AMBR), or QCI information. Compared with current flow context information of the terminal, the flow context information in the path switch request response may be different. For example, after the terminal moves from the Benz NSI 2 to the BMW NSI 1 in a core network, although the BMW NSI 1 accepts the terminal, compared with the existing terminal in the first base station, the priority in the flow context information is lowered.

Operation 404. The first base station receives the path switch request response, and sends a first request response to the terminal.

The first base station performs configuration based on information included in the path switch request response, where the configuration includes but is not limited to DRB configuration and a mapping relationship between a DRB and a flow. In this case, the first base station can support the network slice to which the terminal currently belongs.

The first request response includes all or some information and/or the DRB configuration in the path switch request response. For the terminal in inactive mode or idle mode, the first request response may be an RRC resume request, or may be an RRC reconfiguration request. The first request response includes at least one of network slice indication information, an updated DRB configuration, and an updated mapping relationship between a DRB and a flow.

Operation 405. The terminal receives the first request response, and performs corresponding configuration based on configuration information included in the first request response.

The terminal may store the configuration information, so that the terminal can perform rapid access when the terminal enters an active mode; or may complete a synchronization process with the first base station.

In one embodiment, when the first request response is the RRC resume request, the terminal configures the DRB based on the information included in the first request response.

In one embodiment, when the first request response is the RRC reconfiguration request, the terminal further needs to send an RRC reconfiguration complete message and/or a mapping relationship between a flow and a DRB to the first base station.

Figure 7:
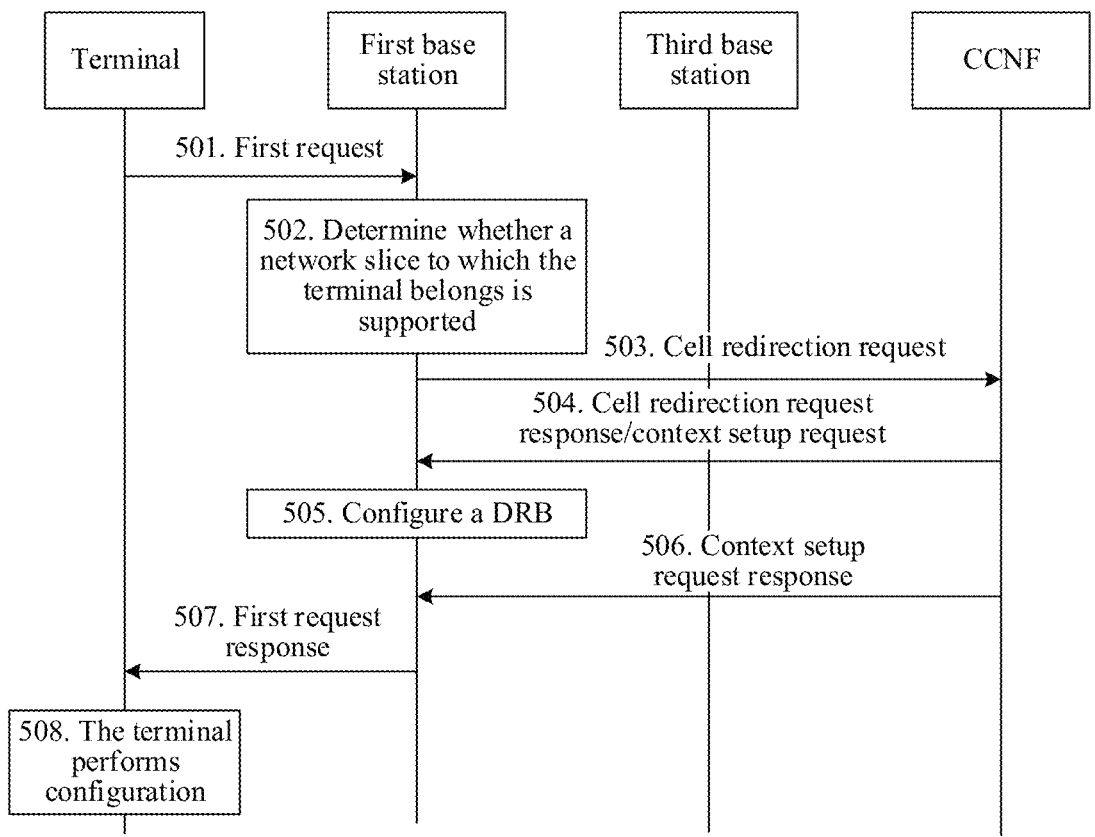
FIG. 7 is a signaling interaction diagram of another communication method according to an embodiment of the present disclosure.

In one embodiment, in another embodiment, referring to FIG. 7, when it is determined that a first base station can support a CCNF of a current network slice of a terminal, but does not support an NSI, the first base station may further request cell relocation from the CCNF. As shown in FIG. 7, a communication method may further include the following operations.

Operation 501. The terminal sends a first request to the first base station, where the first request is used to request an RRC connection from the first base station. For this, refer to the description of operation 401, and details are not described herein again.

Operation 502. The first base station receives the first request, and determines whether the network slice to which the terminal belongs is supported. When the first base station supports the CCNF of the current network slice of the terminal but does not support the NSI, operation 503 is performed. For details, refer to the description of operation 402 shown in FIG. 6, and details are not described herein again.

Operation 503. The first base station sends a cell redirection request to the CCNF, to indicate, to the CCNF, that the terminal moves from a cell on which the terminal previously camps to the first base station. The cell redirection request includes a terminal ID (UE ID). The terminal ID may be at least one of an S-TMSI, a TMSI, a resume ID, or another identifier that uniquely indicates the terminal within coverage of the CCNF. In one embodiment, the cell redirection request may further include an ID (Anchor ID) of the cell on which the terminal previously camps.

Operation 504. The CCNF receives the cell redirection request, and sends a cell redirection request ACK and/or a context setup request message to the first base station. The cell redirection request response includes NSSAI (Accepted NSSAI) allocated by the CCNF to the terminal, and the context setup request message includes context information that is needed for establishing a session for the terminal. For example, context information is established for an NG2 interface.

Operation 505. The first base station receives the cell redirection request response and/or an NG2 interface context setup request message, establishes a corresponding bearer based on flow context information included therein, and matches the established bearer with a flow of the CCNF.

Operation 506. The first base station sends an NG2 interface context setup request response to the CCNF, where the NG2 interface context setup request response includes session indication information (namely, the corresponding bearer established in operation 505 and correspondence information of the bearer and the flow of the CCNF) established on the first base station (RAN side). In one embodiment, when some sessions in the first base station are not successfully established, the NG2 interface context setup request response may further include corresponding S-NSSAI in the accepted NSSAI in operation 504.

Operation 507. The first base station sends a first request response to the terminal, where the first request response includes configuration information. In this embodiment, the configuration information may include at least one of the foregoing flow context information, bearer configuration information, and a correspondence between the bearer and the flow of the CCNF.

Operation 508. The terminal receives the first request response, and performs corresponding configuration based on the configuration information included in the first request response.

In this embodiment, when the base station to which the terminal moves supports the CCNF of the network slice to which the terminal belongs, but does not support the NSI, the base station can perform CCNF path redirection, and after performing the redirection, the base station can support the network slice to which the terminal belongs, thereby reducing a risk of an RRC connection failure.

Figure 8:
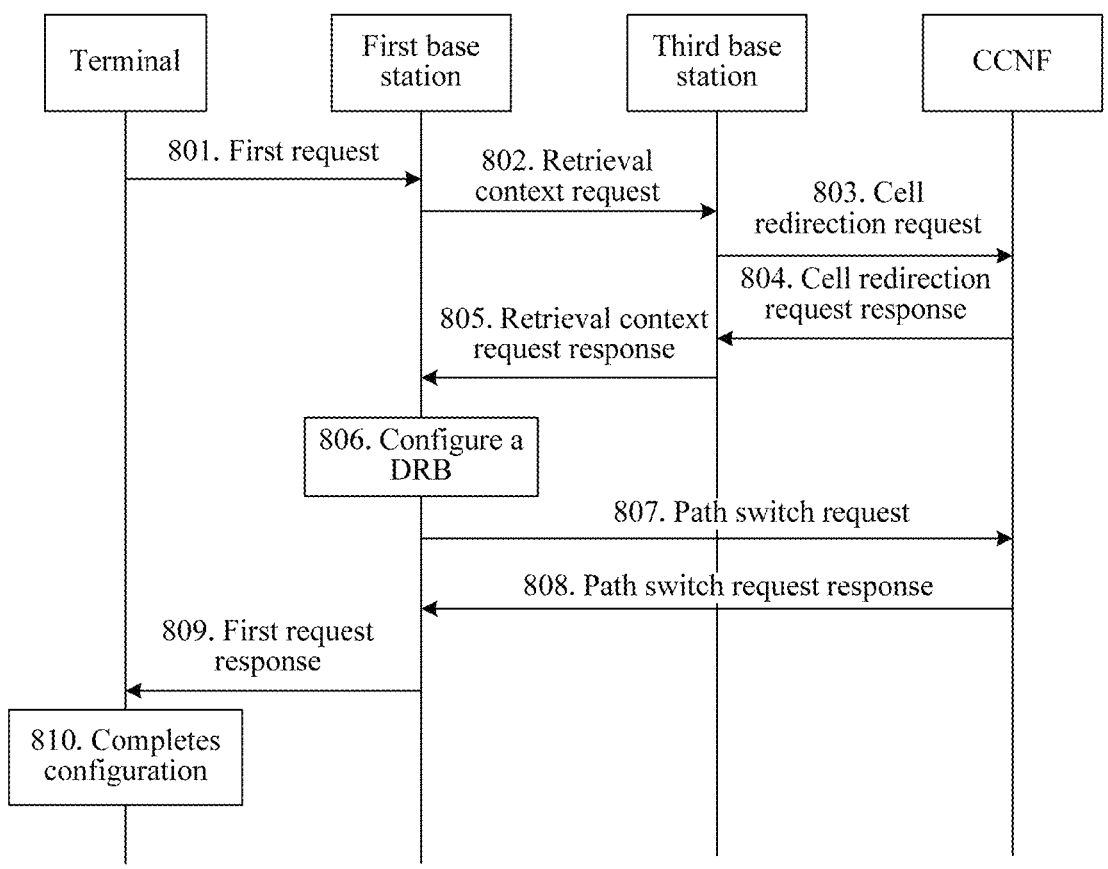
FIG. 8 is a signaling interaction diagram of another communication method according to an embodiment of the present disclosure.

In another embodiment, FIG. 8 is a schematic flowchart of a communication method according to another embodiment of the present disclosure. A first base station is a base station to which a terminal moves, and a third base station is a base station on which the terminal previously camps. The communication method includes the following operations.

Operation 801. The terminal sends a first request to the first base station, where the first request is used to request an RRC connection from the first base station.

Operation 802. The first base station receives the first request of the terminal, and sends a context obtaining request to the third base station. The context obtaining request is used to request context information of the terminal in the third base station. For the context information, refer to the related description in the embodiment shown in FIG. 4. In this embodiment, different parts of the context information in this operation and the context information in the embodiment of FIG. 4 are described, but details of same parts are not described again. In one embodiment, the context obtaining request includes a resume ID, and information (Accept Flag) indicating whether a network slice to which the terminal currently belongs is supported.

Operation 803. The third base station receives the context obtaining request, and determines whether the first base station supports the network slice to which the terminal currently belongs. When determining that the first base station does not support an NSI of the network slice to which the terminal belongs, the third base station sends a cell redirection request to a CCNF. The cell redirection request includes an ID of the first base station and/or an ID of the terminal, and the ID may be a PCI, or may be a GCI, or is in another ID form.

For example, in one case, the first request may carry information indicating whether the first base station supports the network slice to which the terminal currently belongs, so that the third base station can determine, based on the first request, whether the first base station supports the network slice to which the terminal belongs. In another case, before operation 803, the first base station and the third base station may exchange a CCNF and an NSI that are supported by the first base station and those supported by the third base station, so that the third base station can determine, based on the CCNF and the NSI that are supported by the first base station and that are already learned, whether the first base station supports the network slice to which the terminal currently belongs.

Operation 804. The CCNF receives the cell redirection request, and sends a cell redirection request response to the third base station. Specifically, the CCNF may learn of, based on the ID of the first base station carried in the cell redirection request, a first base station to which the terminal needs to be redirected. A session is re-established or a session is modified for the terminal based on a network slice supported by the first base station. For example, a cell redirection request acknowledgment includes at least network slice indication information. The network slice indication information is an NSSAI reconfigured by the CCNF based on the cell redirection request, or may be referred to as an "accepted NSSAI". The network slice indication information includes at least one of the following types of information: an NSSAI, an S-NSSAI, a slice ID, and a temporary ID. Compared with configured network slice indication information that is in one embodiment carried in the first request, some or all S-NSSAI in the network slice indication information herein changes, or SD information of some or all S-NSSAI in accept NSSAI changes. In one embodiment, the cell redirection request acknowledgment may further include updated flow context information, which is generated when the CCNF re-establishes a session or modifies a session for the terminal.

Operation 805. The third base station receives the cell redirection request acknowledgment, and sends a context obtaining request response to the first base station, where the context obtaining request response includes the network slice indication information obtained in operation 804. In one embodiment, when the cell redirection request acknowledgment includes the updated flow context information, the context obtaining request response may further the updated flow context information.

Operation 806. The first base station receives the context obtaining request response, and configures a DRB. Because the context obtaining request response already includes configuration information needed for configuring the DRB, the first base station may perform corresponding configuration. In one embodiment, when obtain a context request includes the updated flow context information, the first base station may further generate a mapping between the DRB and a flow.

Operation 807. The first base station receives the context obtaining request response, and sends a path switch request to the CCNF. For details, refer the description of operation 403 in the embodiment shown in FIG. 6. The following describes different parts after the operation. Details of the same part of operation 807 and operation 403 are not described herein again.

Operation 808. The CCNF receives the path switch request, and sends a path switch request response to the first base station. For details, refer the description of operation 404 in the embodiment shown in FIG. 6. The following describes different parts after the operation. Details of the same part of the two are not described herein again.

Operation 809. The first base station receives the path switch request response, and sends a first request response to the terminal. For details, refer the description of operation 406 in the embodiment shown in FIG. 6. The following describes different parts after the operation. Details of the same part of the two are not described herein again.

Operation 810. After receiving the first request response, the terminal performs corresponding configuration. In one embodiment, after completing the configuration, the terminal stores one or both of network indication information and a DRB configuration.

In this implementation, the third base station may obtain information such as the network slice indication information and the DRB configuration by interacting with the CCNF, so that the DRB configuration and the mapping between the DRB and the flow can be completed before path switching.

Figure 9:
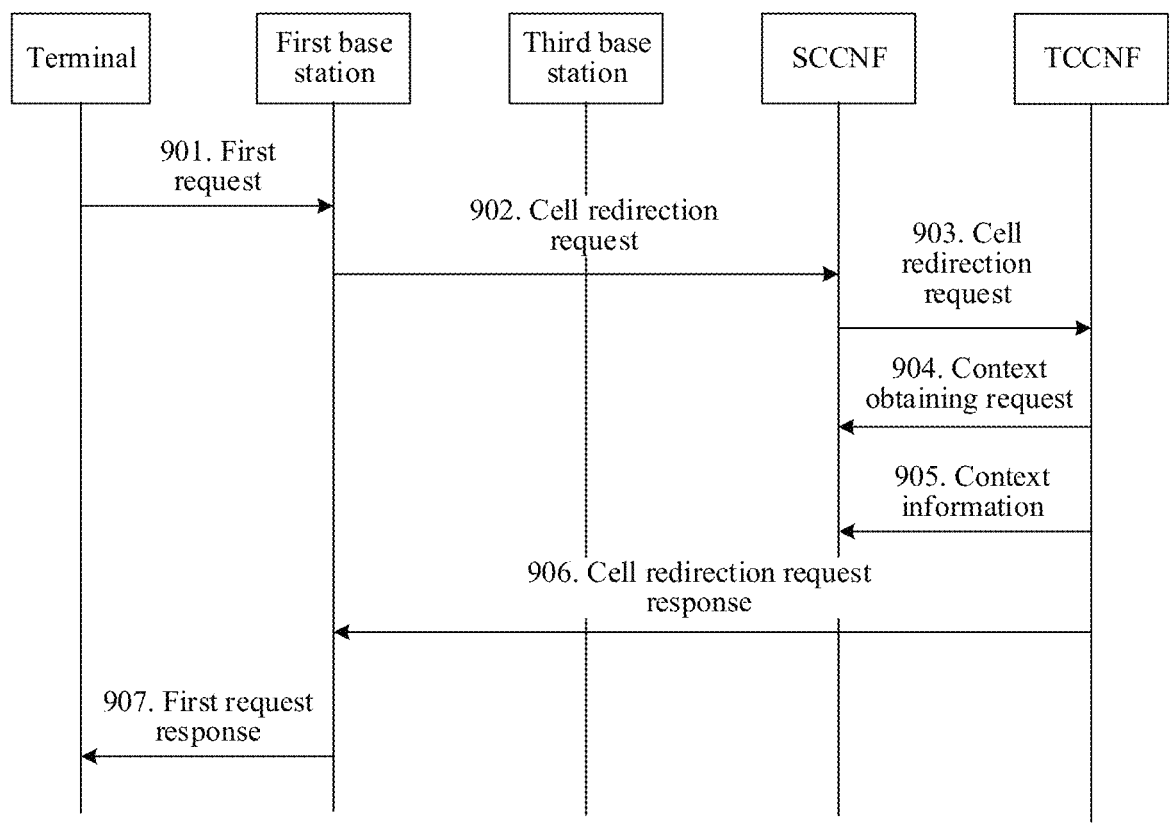
FIG. 9 is a signaling interaction diagram of another communication method according to an embodiment of the present disclosure.

FIG. 9 is a schematic flowchart of a communication method according to another embodiment of the present disclosure.

Operation 901. A first base station receives a first request sent by a terminal, where the first request is used to request an RRC connection from the first base station.

Operation 902. When the first base station does not support a network slice to which the terminal belongs, the first base station sends a cell redirection request to a default CCNF ("SCCNF" hereinafter), where the cell redirection request includes a terminal ID and configured NASSAI.

In one embodiment, in operation 902, when the first request includes configured network slice indication information, the first base station may obtain, based on the configured network slice indication information, a network slice to which the terminal currently belongs, to determine whether the first base station supports the network slice to which the terminal belongs.

In one embodiment, when the first request does not include the configured network slice indication information, the first base station may further obtain, with reference to the manner of operation 3021 to operation 3023 shown in FIG. 5, the network slice to which the terminal currently belongs, to determine whether the first base station supports the network slice to which the terminal belongs. The following describes different parts after the operation. Details of the same part of the two are not described herein again.

Operation 903. The default CCNF receives the cell redirection request, and determines whether CCNF redirection (in other words, selection of another CCNF) needs to be performed. If it is determined that the CCNF redirection does not need to be performed, the default CCNF is used as a target CCNF (where the target CCNF is referred to as a "TCCNF" hereinafter), and the target CCNF is configured to provide a service for the terminal. If it is determined that the CCNF redirection needs to be performed, the cell redirection request is forwarded to another CCNF, and the another CCNF is used as a target CCNF to perform transmission.

Operation 904. The TCCNF receives the cell redirection request, and sends a context obtaining request (retrieval Context Request) to the SCCNF, where the context obtaining request includes the terminal ID and/or the configured NSSAI.

Operation 905. The SCCNF receives a context obtaining request, and the TCCNF feeds back context information of the terminal. The context information includes but is not limited to flow context information, which includes at least one of a flow priority and QoS.

Operation 906. The TCCNF receives the context information, establishes a new session for the terminal based on the flow context information, allocates accepted NSSAI, and sends a cell redirection request response (Cell Redirection Request ACK) to a target base station. The cell reselection request response includes at least one of the accepted NSSAI and the flow context information.

Operation 907. The target base station receives the cell reselection request response, stores new NSSAI, and reconfigures a DRB based on the cell reselection request response, or waits for entering an active mode to use a reconfigured DRB, and sends a first request response to the terminal.

In this embodiment, when the terminal moves to a cell corresponding to the target base station, if the target base station does not support the CCNF of the network slice to which the terminal belongs, the target base station may be a CCNF that requests to support the network slice to which the terminal belongs, thereby avoiding a risk of an RRC connection failure.

Figure 10:
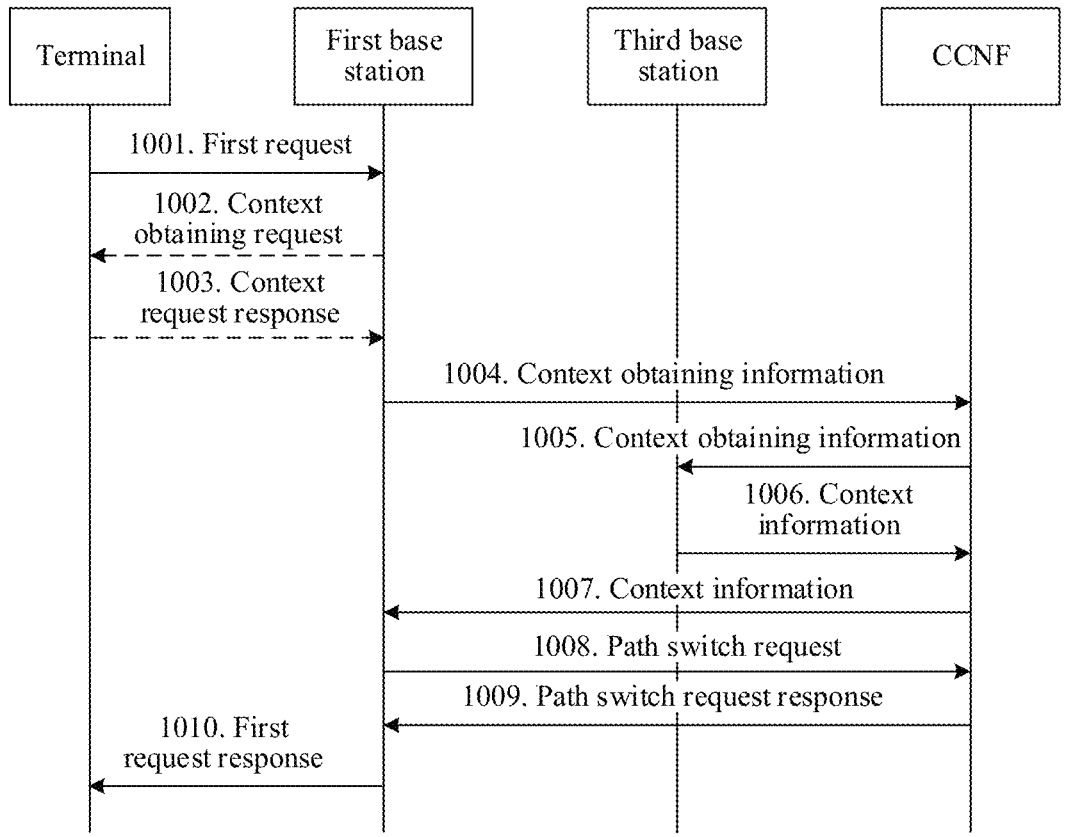
FIG. 10 is a signaling interaction diagram of another communication method according to an embodiment of the present disclosure.

FIG. 10 is a schematic flowchart of a communication method according to another embodiment of the present disclosure. The communication method is applied to a communications system 100. This embodiment may be applied to the following scenario: There is no Xn interface between a first base station corresponding to a cell to which a terminal moves and a second base station corresponding to a cell on which the terminal previously camps, or an Xn interface is unavailable due to network congestion. However, this embodiment is not limited to the foregoing scenario. Even if the Xn interface is available, this solution can still be used for a RAN. For example, if the first base station finds that a current network slice of the terminal cannot be supported, this embodiment can also be used. The communication method in this embodiment includes the following operations.

Operation 1001. The terminal sends a first request to the first base station, where the first request may be an RRC resume request message. For the first request, refer the description of operation 301 in the embodiment shown in FIG. 4. The following describes different parts after the operation. Details of the same part of the two are not described herein again.

Operation 1002. The first base station receives the first request, and sends a first context obtaining request (UE Context Request) to the terminal. The first context obtaining request is used to obtain context information on a side of the terminal. For a specific description of the context information, refer to the definition of the context information in the embodiment shown in FIG. 4. Differences between the two are to be described below. Details of the same part of the two are not described herein again.

Specifically, when the first request does not carry configured network slice indication information, or a corresponding CCNF cannot be found based on carried network slice indication information, the first base station may send a context request to the terminal, to request the context information from the terminal.

In one embodiment, the context request may include cause information, where the cause information is used to indicate, to the terminal, that there is no Xn interface between the first base station and a third base station or an Xn interface between the first base station and a third base station is unavailable, and the terminal may feed back the context information in a targeted manner based on the cause information.

Operation 1003. The terminal receives the context request, and sends terminal context information to the first base station. The context information includes network slice indication information, and the network slice indication information includes at least one of NSSAI, S-NSSAI, a slice ID, and a temp ID. It should be noted that, if the first request does not carry configured network slice indication information, the terminal context information needs to include at least the configured network slice indication information.

In one embodiment, the context information of the terminal may further include a tracking area (TAC), so that the first base station selects a CCNF.

Operation 1004. The first base station receives the terminal context information sent by the terminal, and sends a context obtaining request to the CCNF. The context obtaining request is used to obtain context on a side of the CCNF, and includes a terminal ID. For a detailed description of the obtained context information, refer to the definition of the context information in the embodiment shown in FIG. 4. Differences between the two are to be described below. Details of the same part of the two are not described herein again.

In one embodiment, the context obtaining request further includes at least one of an ID of a cell corresponding to the third base station, information indicating whether the first base station supports a network slice to which the terminal belongs, and information (Accept Flag) indicating whether there is an Xn interface between the first base station and the third base station.

Operation 1005. The CCNF receives the context obtaining request sent by the first base station, and sends the context obtaining request to the third base station. The context obtaining request includes a terminal ID, to indicate, to the third base station, context information of which terminal needs to be provided.

In one embodiment, a second context obtaining request may further include a context form indication, to indicate a form of the context information to be sent by the third base station. The context form indication may be a definition in a reference standard, or a vendor-specific option. For example, the form of the context information may be a container form or a non-container form. Specifically, the container form means that the context information is included in a container message, and the CCNF does not parse or modify the container message. The non-container form means that the context information is fed back in a non-container form, and the CCNF may parse and modify the context information fed back by the third base station.

When the CCNF determines that the first base station supports the network slice to which the terminal belongs, the CCNF may require the terminal to send the context information in the container form, so that the context information can be transparently transmitted to the third base station. When the CCNF determines that the first base station does not support the network slice to which the terminal belongs, the CCNF may require the terminal to send the context information in the non-container form, so that the CCNF can parse and modify the context information sent by the third base station.

Operation 1006. The third base station receives the context obtaining request of the CCNF, and feeds back context information to the CCNF.

Operation 1007. The CCNF receives the context information, and sends the context information to the first base station.

When the context information received by the CCNF is in the container form, the CCNF transparently transmits the context information to the first base station in the container form. When the context information received by the CCNF is not in the container form, the CCNF parses and modifies the context information sent by the third base station, specifically, modifies NSSAI information and flow context information therein, and sends the context information to the first base station. The context information includes information about a radio bearer established by the terminal on the third base station, and network slice information corresponding to the radio bearer. In one embodiment, the context information may further include session information (including at least one of an ID of a session/flow and QoS information of the session/flow) after network slice remapping.

For operations 1008 and 1009, refer to the descriptions of operations 402 to 404 in the embodiment shown in FIG. 6 or operations 807 to 809 in the embodiment shown in FIG. 8. Details are not described herein again.

Figure 11:
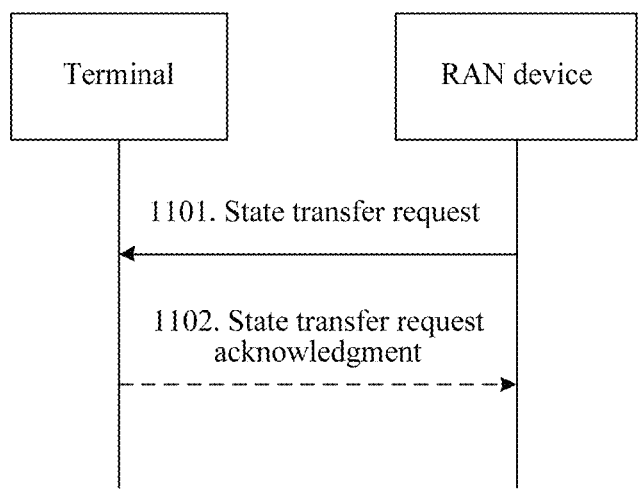
FIG. 11 is a signaling interaction diagram of another communication method according to an embodiment of the present disclosure.

FIG. 11 is a schematic flowchart of another communication method according to an embodiment of the present disclosure. The method may be applied to a communications system 100, and includes the following operations.

Operation 1101. A RAN device sends a state switch request to a terminal.

For example, when the terminal is in an RRC connection state, and there is no data transmission within a period of time, to reduce energy consumption of the terminal, a network side may set the terminal to an inactive state.

For example, the foregoing state switch request may be transmitted by using RRC signaling. In a first case, the RRC signaling may include a RAN notification area (RNA) and information indicating whether the RAN device supports a network slice to which the terminal currently belongs. In a second case, the RRC signaling may include a TA and information indicating whether all cells within the TA support a network slice to which the terminal currently belongs. In a third case, the RRC signaling may further include an RNA of the terminal and bitmap information indicating whether the RNA supports a network slice to which the terminal currently belongs. Alternatively, in a fourth case, the RRC signaling may include a manner of a cell list that supports a CCNF to which the terminal currently belongs or the network slice to which the terminal currently belongs. Alternatively, in a fifth case, the RRC signaling may include a list of IDs of RNAs supporting the network slice to which the terminal currently belongs or a list of TAs supporting the network slice to which the terminal currently belongs.

The RNA may be one cell, or may include a plurality of cells. When the terminal moves within coverage of the RNA, a network side does not need to be notified. When the terminal moves out of coverage of the RNA, the network side needs to be notified. The RNA may be indicated by using one RNA ID. In this case, the RNA ID indicates coverage of an RNA including one or more fixed cells. Alternatively, the RNA may be identified in a form of a cell list, for example, a physical cell identity (PCI) list, or in another list form. In this embodiment, that the RNA is identified by using an RNA ID is used as an example for description.

In the first case, the RRC signaling includes indication information of the terminal that indicates whether the RNA and the RAN device support the network slice to which the terminal currently belongs. In one embodiment, the indication information is 1 bit, and used to indicate that all cells in the current RNA support the network slice to which the terminal belongs.

In the second case, RRC release signaling includes information indicating whether a tracking area (TA) and all cells within the TA support the network slice to which the terminal belongs.

In the third case (in this case, the RNA definitely exists in a form of a cell list), and the RRC signaling includes bitmap information of the network slice, where the bitmap information is used to indicate whether one or more cells in the RNA support the network slice to which the terminal currently belongs. For example, the bitmap information is a binary character string, and a quantity of bits of the character string is the same as a quantity of cells in the RNA cell list. A bit of the character string may be set to 0, to indicate that a corresponding cell does not support the network slice to which the terminal belongs, or may be set to 1, to indicate that a corresponding cell supports the network slice to which the terminal belongs. The reverse is also true. For example, when there are four cells in the RNA cell list, and the PCI list is represented as (PCI #1, PCI #2, PCI #4, PCI #5), if the bitmap information is 0101, it indicates that cells corresponding to PCI #2 and PCI #5 support the network slice to which the terminal belongs and the terminal can access the cells corresponding to PCI #2 and PCI #5, and that cells corresponding to PCI #1 and PCI #4 do not support the network slice to which the terminal belongs, and the terminal possibly cannot access the cells corresponding to PCI #1 and PCI #4.

In the fourth case, the RRC signaling includes the cell list that supports the network slice to which the terminal currently belongs, and the cell list may be a PCI list or a GCI list, or is in another list form. In one indication manner, all cells in the cell list of the network slice support the network slice to which the terminal currently belongs. In this way, when the terminal moves to a cell in the cell list of the network slice, the terminal can access the cell. In another indication manner, none of cells in the cell list of the network slice support the network slice to which the terminal currently belongs. In this way, when the terminal moves to a cell in the cell list of the network slice, the terminal possibly cannot access the cell, but when the terminal moves to a cell outside the cell list of the network slice, the terminal can access the cell. Therefore, this can be applicable to different application scenarios.

In the fifth case, to be specific, in the state switch message, the list of IDs of RNAs supporting the network slice to which the terminal currently belongs or a list of TAs supporting the network slice to which the terminal currently belongs may further be notified.

Operation 1102. The terminal receives the state switch request, and in response to the state switch request, sends a state switch acknowledgment message to the RAN device.

Figure 12:
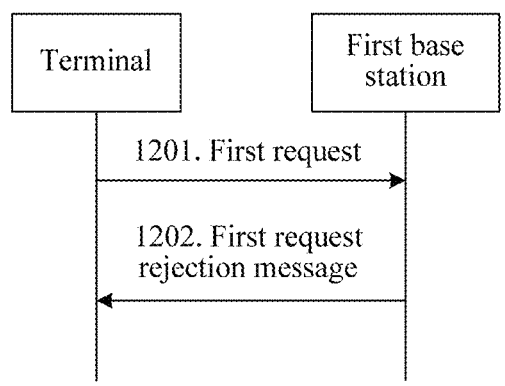
FIG. 12 is a signaling interaction diagram of another communication method according to an embodiment of the present disclosure.

In one embodiment, referring to FIG. 12, in still another embodiment, when the first base station does not support the network slice to which the terminal belongs, the communication method further includes the following operations.

Operation 1201. The first base station receives the first request sent by the terminal, where the first request is used to request an RRC connection from the first base station.

Operation 1202. When the first base station does not support the network slice to which the terminal belongs, the first base station sends a first request rejection message to the terminal. The first request rejection message may include at least one of a cell list or a target base station (Target cell ID) that supports the network slice to which the terminal currently belongs, and information about a frequency (Target Frequency, and a center frequency of each cell) of a cell that supports the network slice to which the terminal currently belongs. When the terminal is in inactive mode, the first request rejection message may be referred to as an RRC resume rejection message (RRC Resume Reject). When the terminal is in idle mode, the first request rejection message may be referred to as an RRC rejection message (RRC Resume Reject).

For a method in which the first base station determines the network slice to which the terminal belongs, refer to the foregoing method embodiment. Details are not described herein again.

The first request rejection message is sent to the terminal, to notify the terminal that the terminal needs to access another cell, and information that can assist the terminal in accessing a cell that supports the network slice to which the terminal belongs is sent to the terminal.

Figure 13:
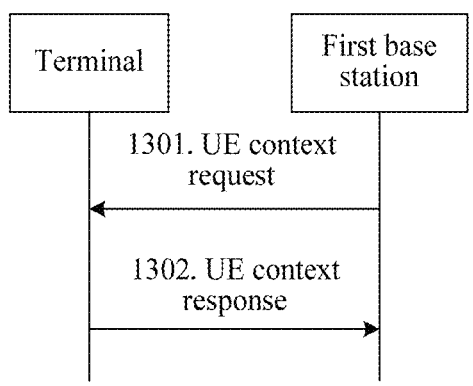
FIG. 13 is a signaling interaction diagram of another communication method according to an embodiment of the present disclosure.

Referring to FIG. 13, in still another embodiment, when the Xn interface between the first base station and the third base station is unavailable, the communication method further includes the following operations.

Operation 1301. The first base station sends a UE context request to the terminal, to request context information from the terminal. In one embodiment, the UE context request may include a cause message, to notify UE of a cause for unavailability of the Xn interface between the first base station and the third base station, and this may be that no Xn interface is disposed between the first base station and the third base station, or may be that the Xn interface between the first base station and the third base station is unavailable.

Operation 1302. The terminal receives the UE context request, and sends a UE context response to the first base station, where the UE context response includes at least one of NSSAI, S-NSSAI, a slice ID, a temp ID, and a TAC.

The foregoing describes in detail the communication method and the communications system in the embodiments of the present disclosure with reference to FIG. 1 to FIG. 13. The following describes in detail a communications device in the embodiments of the present disclosure with reference to FIG. 14 to FIG. 17.

Figure 14:
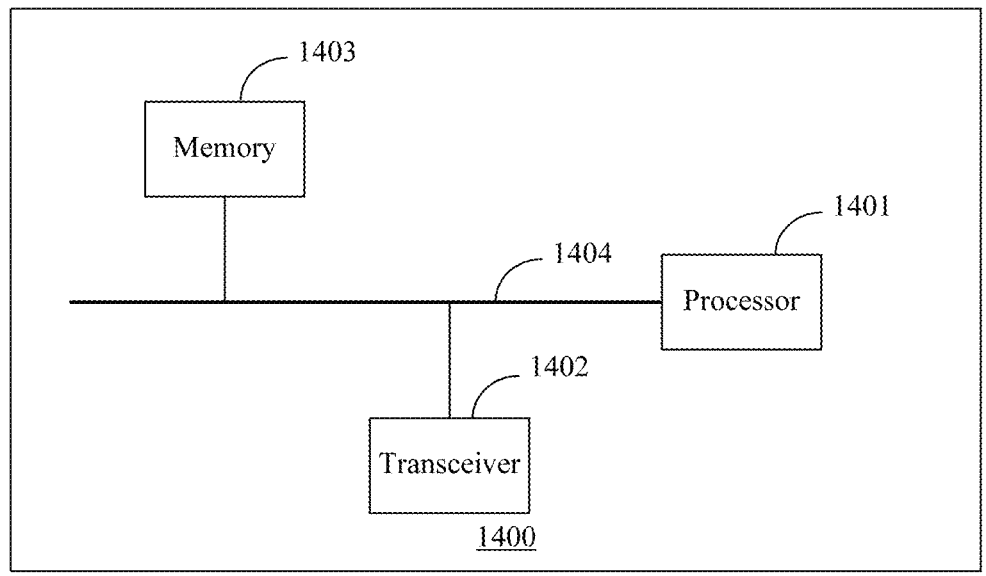
FIG. 14 is a simplified schematic structural diagram of a communications device according to an embodiment of the present disclosure.

FIG. 14 is a simplified structural diagram of a communications device according to an embodiment of the present disclosure. The communications device may correspond to (for example, may be configured on or may be) the first base station described in the communication methods shown in FIG. 4 to FIG. 13. The communications apparatus 1400 may include a processor 1401 and a transceiver 1402. The processor is in communication connection with the transceiver. In one embodiment, the communications apparatus 1400 further includes a memory 1403. The memory 1403 is in communication connection with the processor 1401. In one embodiment, the processor 1401, the memory 1403, and the transceiver 1402 are in communication connection with one another by using the bus 1404. The memory 1403 may be configured to store an instruction. The processor 601 is configured to execute the instruction stored in the memory, to control the transceiver 1402 to send information or a signal. The processor 1401 and the transceiver 1402 are separately configured to perform actions or processing processes performed by the first base station in the methods in the embodiments of FIG. 4 to FIG. 13. Herein, to avoid repetition, detailed descriptions are omitted.

It may be understood that FIG. 14 shows merely a simplified design of the base station. In actual application, the base station may include any quantity of transmitters, receivers, processors, controllers, memories, communications units, and the like, and all base stations that can implement the present disclosure shall fall within the protection scope of the present disclosure.

Figure 15:
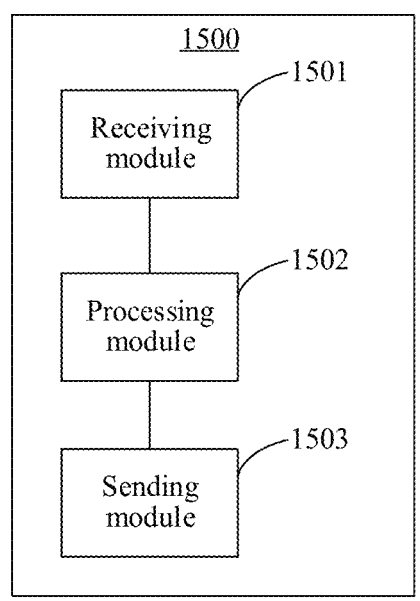
FIG. 15 is a schematic block diagram of a communications device according to an embodiment of the present disclosure.

FIG. 15 is a schematic block diagram of a communications device according to an embodiment of the present disclosure. The communications device may correspond to (for example, may be configured on or may be) the first base station described in the communication methods shown in FIG. 4 to FIG. 13. The communications apparatus 1500 may include a sending module 1501, a processing module 1502, a sending module 1503, and a sending module 1501. The processing module 1502 is in communication connection with the sending module 1503. The modules or units in the communications device 1500 are separately configured to perform actions or processing processes performed by the first base station in the methods in the embodiments of FIG. 4 to FIG. 13. Herein, to avoid repetition, detailed descriptions are omitted.

Figure 16:
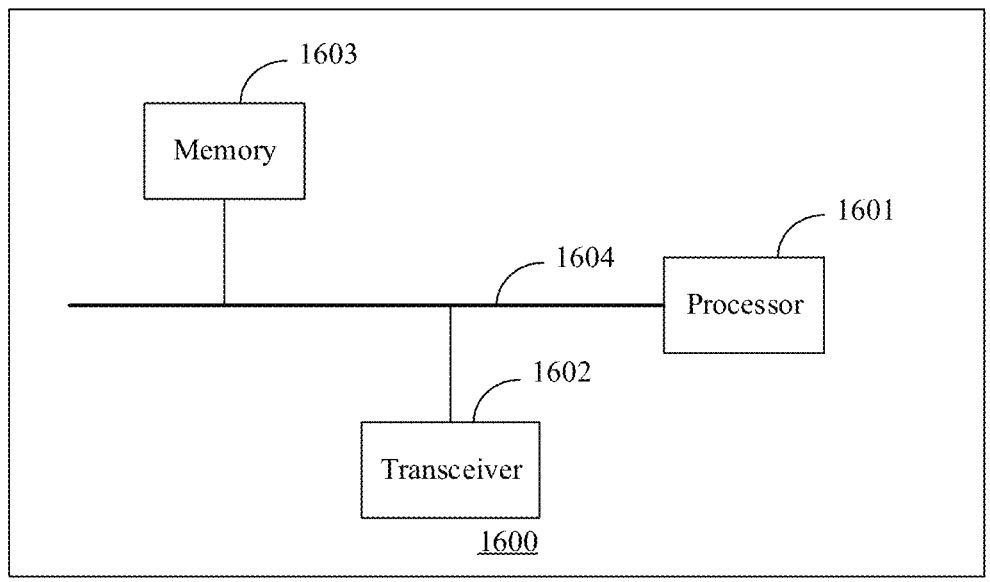
FIG. 16 is a simplified schematic structural diagram of a terminal according to an embodiment of the present disclosure.

FIG. 16 is a simplified structural diagram of a terminal according to an embodiment of the present disclosure. The communications device may correspond to (for example, may be configured on or may be) the terminal described in the communication methods shown in FIG. 4 to FIG. 13. The communications apparatus 1600 may include a processor 1601 and a transceiver 1602. The processor is in communication connection with the transceiver. In one embodiment, the communications apparatus 1600 further includes a memory 1603. The memory 1603 is in communication connection with the processor 1601. In one embodiment, the processor 1601, the memory 1603, and the transceiver 1602 may be in communication connection with one another by using the bus 1604. The memory 1603 may be configured to store an instruction. The processor 601 is configured to execute the instruction stored in the memory, to control the transceiver 1602 to send information or a signal. The processor 1601 and the transceiver 1602 are separately configured to perform actions or processing processes performed by the terminal in the methods shown in FIG. 4 to FIG. 13. Herein, to avoid repetition, detailed descriptions are omitted.

Figure 17:
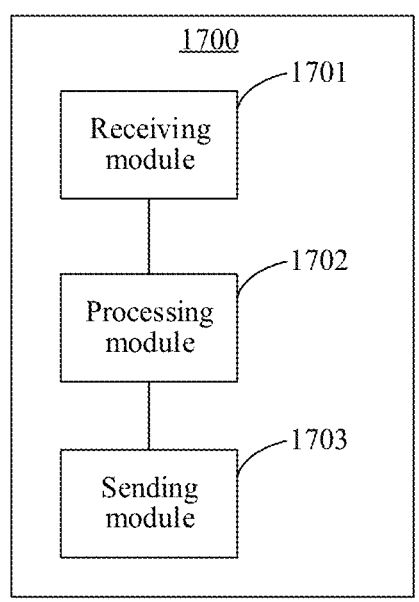
FIG. 17 is a schematic block diagram of a terminal according to an embodiment of the present disclosure.

It may be understood that FIG. 16 shows merely a simplified design of the terminal. In actual application, the base station may include any quantity of transmitters, receivers, processors, controllers, memories, communications units, and the like, and all base stations that can implement the present disclosure shall fall within the protection scope of the present disclosure.

FIG. 17 is a schematic block diagram of a communications device according to an embodiment of the present disclosure. The communications device may correspond to (for example, may be configured on or may be) the first base station described in the communication methods shown in FIG. 4 to FIG. 13. The communications apparatus 1700 may include a sending module 1701, a processing module 1702, a sending module 1703, and a sending module 1701. The processing module 1702 is in communication connection with the sending module 1703. The modules or units in the communications device 1700 are separately configured to perform actions or processing processes performed by the first base station in the methods in the embodiments of FIG. 4 to FIG. 13. Herein, to avoid repetition, detailed descriptions are omitted.

All or some of the foregoing embodiments may be implemented by means of software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, the procedure or functions according to the embodiments of the present disclosure are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like. A person skilled in the art may use different methods to implement the described functions for each particular application, but it should not be considered that the implementation goes beyond the scope of the present disclosure.

It should be understood that, the processor (601, 801, 1001, 1201) in the apparatus embodiment of the present disclosure may be a central processing unit (CPU), a network processor (NP), a hardware chip, or any combination thereof. The hardware chip may be an application-specific integrated circuit (ASIC), a programmable logic device (PLD), or a combination thereof. The PLD may be a complex programmable logic device (CPLD), a field-programmable gate array (FPGA), generic array logic (GAL), or any combination thereof.

The memory (603, 803, 1003, 1203) in the apparatus embodiment of the present disclosure may be a volatile memory, for example, a random access memory (RAM); or may be a non-volatile memory, for example, a read-only memory (ROM), a flash memory, a hard disk drive (HDD), or a solid-state drive (SSD); or may be a combination of the foregoing types of memories.

In the several embodiments provided in the present disclosure, it should be understood that the disclosed apparatus and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of the present disclosure may be integrated into one processing unit, or each of the units may exist alone physically, or two or more units are integrated into one unit.

When functions are implemented in a form of a software functional unit and sold or used as an independent product, the functions may be stored in a computer-readable storage medium. Based on such an understanding, the technical solutions of the present disclosure essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the operations of the methods in the embodiments of the present disclosure. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A communication method, comprising:
receiving, by a first base station, a first request sent by a terminal, wherein the first request is used to request a radio resource control (RRC) connection from the first base station, wherein the first request comprises a cell list of cells, including a second base station, that the terminal is allowed to access;
sending, by the first base station, a handover request to the second base station when the first base station does not support a network slice to which the terminal belongs, wherein the second base station supports the network slice to which the terminal belongs; and
receiving, by the first base station, a handover request response from the second base station, and sending a first request response to the terminal, wherein the first request response comprises configuration information of the second base station.

2. The communication method according to claim 1, wherein the sending, by the first base station, a handover request to a second base station comprises:
   selecting the second base station based on the cell list, and sending the handover request to the selected second base station.

3. The communication method according to claim 1, wherein the first request further comprises at least one of the following messages:
   network slice indication information, used to notify the first base station of information about the network slice to which the terminal belongs; and
   cause information, used to notify the first base station of an objective of sending the first request.

4. The communication method according to claim 1, wherein after the receiving, by a first base station, a first request sent by a terminal, the method further comprises:
   sending, by the first base station, a second request to a third base station, wherein the third base station is a base station on which the terminal previously camps, the second request is used to request context information of the terminal on the third base station, and the context information is configuration information when the terminal camps on the third base station; and
   receiving, by the first base station, the context information of the third base station.

5. The communication method according to claim 4, wherein the context information comprises at least one of the following messages:
   flow context information, wherein the flow context information is information about a flow already allocated by the terminal, and comprises at least one of flow ID information, flow priority information, QoS information, and network slice information corresponding to the flow;
   bearer information, wherein the bearer information is information about a bearer already allocated by the terminal, and comprises at least one of bearer ID information, QoS information, and network slice information corresponding to the bearer;
   information about a mapping between the flow and the bearer; and
   at least one of single network slice selection assistance information (S-NSSAI), network slice selection assistance information (NSSAI), a network slice identifier (slice ID), and a temporary identifier (temp ID) of the terminal.

6. The communication method according to claim 1, wherein the sending, by the first base station, a handover request to a second base station comprises:
   sending, by the first base station, a measurement request to the terminal, wherein the measurement request is used to obtain a cell list that the terminal is allowed to access;
   receiving, by the first base station, a measurement report, and selecting, by the first base station, the second base station based on the measurement report; and
   sending, by the first base station, the handover request to the selected second base station.

7. A communication method, comprising:
   sending, by a terminal, a first request to a first base station, wherein the first request is used to request an RRC connection from the first base station, wherein the first request comprises a cell list of cells, including a second base station, that the terminal is allowed to access; and
   receiving, by the terminal, a first request response from the first base station, wherein the first request response comprises configuration information of the second base station, the second base station is a base station that supports a network slice to which the terminal belongs and that is determined by the first base station when the first base station does not support the network slice to which the terminal belongs, and handing over, by the terminal, to the second base station based on the first request response.

8. The communication method according to claim 7, wherein the method further comprises:
   receiving, by the terminal, a measurement request sent by the first base station, wherein the measurement request is used to obtain a cell list that the terminal is allowed to access; and
   generating, by the terminal, a measurement report, and sending the measurement report to the first base station.

9. A communications device, comprising:
   a transceiver, configured to receive a first request sent by a terminal, wherein the first request is used to request an RRC connection from a first base station, wherein the first request comprises a cell list of cells, including a second base station, that the terminal is allowed to access; and
   a processor, configured to generate a handover request when the first base station does not support a network slice to which the terminal belongs, wherein the second base station supports the network slice to which the terminal belongs, wherein
   the transceiver is further configured to: send the handover request to the second base station, receive a handover request response from the second base station, and send a first request response to the terminal, wherein the first request response comprises configuration information of the second base station.

10. The communications device according to claim 9, wherein the processor is further configured to select the second base station based on the cell list.

11. The communication device according to claim 9, wherein the first request further comprises at least one of the following messages:
    network slice indication information, used to notify the first base station of information about the network slice to which the terminal belongs; and
    cause information, used to notify the first base station of an objective of sending the first request.

12. The communications device according to claim 9, wherein the transceiver is further configured to:
    send a second request to a third base station, wherein the third base station is a base station on which the terminal previously camps, the second request is used to request context information of the terminal on the third base station, and the context information is configuration information when the terminal camps on the third base station; and
    receive the context information of the third base station.

13. The communications device according to claim 12, wherein the context information comprises at least one of the following messages:
    flow context information, wherein the flow context information is information about a flow already allocated by the terminal, and comprises at least one of flow ID information, flow priority information, QoS information, and network slice information corresponding to the flow;

bearer information, wherein the bearer information is information about a bearer already allocated by the terminal, and comprises at least one of bearer ID information, QoS information, and network slice information corresponding to the bearer;

information about a mapping between the flow and the bearer; and at least one of single network slice selection assistance information (S-NSSAI), network slice selection assistance information (NSSAI), a network slice identifier (slice ID), and a temporary identifier (temp ID) of the terminal.

14. A terminal, comprising:

a transceiver, configured to: send a first request to a first base station, wherein the first request is used to request an RRC connection from the first base station, wherein the first request comprises a cell list of cells, including a second base station, that the terminal is allowed to access; and receive a first request response from the first base station, wherein the first request response comprises configuration information of the second base station, and the second base station is a base station that supports a network slice to which the terminal belongs and that is determined by the first base station when the first base station does not support the network slice to which the terminal belongs; and a processor, configured to hand over to the second base station based on the first request response.

15. The terminal according to claim 14, wherein the transceiver is further configured to receive a measurement request sent by the first base station, wherein the measurement request is used to obtain a cell list that the terminal is allowed to access; and the processor is configured to generate a measurement report, and the transceiver is further configured to send the measurement report.

* * * * *